(12) United States Patent
Weinstein et al.

(10) Patent No.: US 10,169,445 B2
(45) Date of Patent: Jan. 1, 2019

(54) SYSTEMS AND METHODS FOR DETERMINING OPTIMAL PARAMETERS FOR DYNAMIC QUANTUM CLUSTERING ANALYSES

(71) Applicants: The Board of Trustees of the Leland Stanford Junior University, Stanford, CA (US); Ramot at Tel Aviv University Ltd., Tel Aviv (IL)

(72) Inventors: Marvin Weinstein, Palo Alto, CA (US); David Horn, Tel Aviv (IL)

(73) Assignees: The Board of Trustees of the Leland Stanford Junior University, Stanford, CA (US); Ramot at Tel Aviv University Ltd., Tel Aviv (IL)

( * ) Notice: Subject to any disclaimer, the term of this patent is extended or adjusted under 35 U.S.C. 154(b) by 623 days.

(21) Appl. No.: 14/492,677

(22) Filed: Sep. 22, 2014

(65) Prior Publication Data

US 2015/0046457 A1    Feb. 12, 2015

Related U.S. Application Data

(63) Continuation-in-part of application No. 14/482,961, filed on Sep. 10, 2014, now Pat. No. 9,646,074, which
(Continued)

(51) Int. Cl.
| | | |
|---|---|---|
| *G06F 7/60* | (2006.01) | |
| *G06F 17/30* | (2006.01) | |
| *G06K 9/62* | (2006.01) | |

(52) U.S. Cl.
CPC ....... *G06F 17/30601* (2013.01); *G06K 9/622* (2013.01); *G06K 9/6247* (2013.01)

(58) Field of Classification Search
CPC . G06F 17/30601; G06K 9/622; G06K 9/6247
(Continued)

(56) References Cited

U.S. PATENT DOCUMENTS 6,021,383 A * 2/2000 Domany ........... G06F 17/30705
382/225
7,260,259 B2 * 8/2007 Comaniciu ............ G06K 9/342
382/162
(Continued)

OTHER PUBLICATIONS

Yao et al. (Quantum Clustering Algorithm based on Exponent Measuring Distance, 2008, IEEE, pp. 436-439).*
(Continued)

*Primary Examiner* — Kamini S Shah
*Assistant Examiner* — Iftekhar Khan
(74) *Attorney, Agent, or Firm* — KPPB LLP

(57) ABSTRACT

In the present work, quantum clustering is extended to provide a dynamical approach for data clustering using a time-dependent Schrödinger equation. To expedite computations, we can approximate the time-dependent Hamiltonian formalism by a truncated calculation within a set of Gaussian wave-functions (coherent states) centered around the original points. This allows for analytic evaluation of the time evolution of all such states, opening up the possibility of exploration of relationships among data points through observation of varying dynamical-distances among points and convergence of points into clusters. This formalism may be further supplemented by preprocessing, such as dimensional reduction through singular value decomposition and/or feature filtering. Additionally, the parameters of the analysis can be modified in order to improve the efficiency of the dynamic quantum clustering processes.

18 Claims, 18 Drawing Sheets

Related U.S. Application Data is a continuation of application No. 12/586,036, filed on Sep. 15, 2009, now Pat. No. 8,874,412.

(60) Provisional application No. 61/881,399, filed on Sep. 23, 2013, provisional application No. 61/198,621, filed on Nov. 7, 2008.

(58) Field of Classification Search
USPC .......................................................... 703/2
See application file for complete search history.

(56) References Cited

U.S. PATENT DOCUMENTS

| | | | | |
|---|---|---|---|---|
| 7,613,572 | B2* | 11/2009 | Ben-Gal | G06K 9/6282 |
| | | | | 700/1 |
| 8,536,667 | B2* | 9/2013 | de Graff | H01L 29/82 |
| | | | | 257/419 |
| 8,874,412 | B2 | 10/2014 | Weinstein et al. | |
| 9,646,074 | B2 | 5/2017 | Weinstein et al. | |
| 2004/0117403 | A1* | 6/2004 | Horn | G06F 17/30595 |
| 2007/0180586 | A1* | 8/2007 | Amin | G06N 99/002 |
| | | | | 257/9 |
| 2008/0035911 | A1* | 2/2008 | Gilbert | B82Y 10/00 |
| | | | | 257/14 |
| 2008/0059512 | A1* | 3/2008 | Roitblat | G06F 17/30705 |
| 2008/0147360 | A1* | 6/2008 | Fejes | G06F 19/16 |
| | | | | 703/2 |
| 2010/0119141 | A1* | 5/2010 | Weinstein | G06K 9/622 |
| | | | | 382/133 |
| 2011/0313741 | A1* | 12/2011 | Langhoff | G06F 19/704 |
| | | | | 703/2 |
| 2012/0132891 | A1* | 5/2012 | Pease, III | B82Y 30/00 |
| | | | | 257/21 |
| 2012/0321204 | A1* | 12/2012 | Fertik | G06F 17/3071 |
| | | | | 382/225 |
| 2014/0324766 | A1* | 10/2014 | Alboszta | G06N 99/002 |
| | | | | 706/57 |
| 2015/0032750 | A1 | 1/2015 | Weinstein et al. | |

OTHER PUBLICATIONS

Peter Wittek ("High-Performance Dynamic Quantum Clustering on Graphics Processors", Journal of Computational Physics, 2012, pp. 1-20).*

Horn et al. ("Algorithm for Data Clustering in Pattern Recognition Problems Based on Quantum Mechanics", The American Physical Society, 2001, pp. 1-4).*

Weinstein et al. ("Dynamic quantum clustering: a method for visual exploration of structures in data", SLAC-PUB-13759, 2009, pp. 1-15).*

Devitt et al. (High Performance Quantum Computing, 2008, arXiv, pp. 1-4).*

Wang et al. (Solving Schrödinger's equation around a desired energy: Application to silicon quantum dots, American Institute of Physics, 1994, pp. 2394-2397).*

Devitt et al. ("High Performance Quantum Computing", 2008, pp. 1-4).*

Aimur et al. ("Quantum Clustering Algorithms", 24th International Conference on Machine Learning, Corvallis, OR, 2001, pp. 1-8).*

Shuai et al. ("Entanglement Partitioning of Quantum Particles for Data Clustering", IEEE, 2006, pp. 1-6).*

Horn et al. ("The Method of Quantum Clustering", ResearchGate, 2002, pp. 1-9).*

Aimeur et al., "Quantum Clustering Algorithms", International Conference on Machine Learning, Jun. 20, 2007, pp. 1-8.

Alter et al., "Singular value decomposition for genome-wide expression data processing and modeling", PNAS, vol. 97, No. 18, Aug. 29, 2000, pp. 10101-10106.

Andrews et al., "Transmission X-Ray Microscopy for Full-Field Nano Imaging of Biomaterials", Microscopy Research and Technique, Aug. 23, 2010, 11 pgs.

Baer et al., "The Nov. 22, 1995, M2 7.2 Gulf of Elat earthquake cycle revisited", Geophys. J. Int., Jun. 30, 2008, vol. 175, pp. 1040-1054.

Coifman et al., "Geometric diffusions as a tool for harmonic analysis and structure definition of data: Multiscale methods", PNAS, vol. 102, No. 21, May 24, 2005, pp. 7432-7437.

Duda et al., "Pattern Classification", 2nd Ed., Wiley-Interscience, New York, Jun. 2, 2001 (presented in 7 parts).

Golub, T. R., "Molecular Classification of Cancer: Class Discovery and Class Prediction by Gene Expression Monitoring", Science, vol. 286, Oct. 15, 1999, pp. 531-537.

Guleser, "Clustering Within Quantum Mechanical Framework, Springer-Verlag", Berlin Heidelberg Dec. 20, 2005, cover pgs., pp. 182-187.

Hofstetter, "Seismic observations of the Nov. 22, 1995 Gulf of Aqaba earthquake sequence", Tectonophysics, Jul. 3, 2003, vol. 369, pp. 21-36.

Hofstetter et al., "Source mechanism of the Nov. 22, 1995 Gulf of Aqaba earthquake and its aftershock sequence", Journal of Seismology, Jan. 1, 2003, vol. 7, pp. 99-114.

Jain et al., "Data Clustering: A Review", ACM Computing Surveys, vol. 31, No. 3, Sep. 1, 1999, pp-1-60.

Klauder et al., "A Coherent-State Primer", World Scientific, Singapore, Apr. 1, 1985, 121 pgs., (presented in two parts).

Lafon et al., "Diffusion Maps and Coarse-Graining: A Unified Framework for Dimensionality Reduction, Graph Partitioning and Data Set Parameterization", IEEE Transactions on Pattern Analysis and Machine Intelligence, vol. 28, No. 9, Sep. 28, 2006, pp. 1393-1403.

Liu et al., "TXM-Wizard: a program for advanced data collection and evaluation in full-field transmission X-ray microscopy", Journal of Synchrotron Radiation, Mar. 1, 2012, vol. 19, pp. 281-287.

Nadler et al., "Diffusion maps, spectral clustering and reaction coordinates of dynamical systems", Applied Computational Harmonic Analysis, vol. 21, Jun. 9, 2006, pp. 113-127.

Oliveira et al., "A Privacy-Preserving Clustering Approach Toward Secure and Effective Data Analysis for Business Collaboration", ICDM, Nov. 1, 2004, pp. 1-33.

Parzen, "On Estimation of a Probability Density Function and Mode", Annals of Mathematical Statistics, vol. 33, Issue 3, Sep. 1, 1962, pp. 1065-1076.

Roberts, Stephen, "Parametric and Non-parametric Unsupervised Cluster Analysis", In press: Pattern Recognition, Apr. 1, 1996, 23 pgs.

Shuai, "Entanglement Partitioning of Quantum Particles for Data Clustering", Proc. 30th Intl. Computer Software and Applications Conference, Sep. 17-21, 2006, 6 pgs.

Shuai et al., "Self-Organizing Data Clustering Based on Quantum Entanglement Model", Proc. 1st Intl. Multi-Symposium on Computer and Computational Sciences, Apr. 20-24, 2006, 8 pgs.

Varshavsky et al., "COMPACT: A Comparative Package for Clustering Assessment", ISPA Workshops 2005, Lecture Notes in Computer Science, vol. 3759, Oct. 1, 2005, pp. 159-167.

Varshavsky et al., "Novel Unsupervised Feature Filtering of Biological Data", Bioinformatics, vol. 22, No. 14, Jul. 15, 2006, pp. e507-e513.

Wessel et al., "Free Software Helps Map and Display Data", Eos, Oct. 8, 1991, vol. 72, No. 41, pp. 441, 445-446.

Wolfe et al., "Learning From Text: Matching Readers and Texts by Latent Semantic Analysis", Discource Processes, 25, 1998, pp. 309-336.

Coifman et al., "Geometric diffusions as a tool for harmonic analysis and structure definition of data: Diffusion maps", PNAS, May 24, 2005, vol. 102, No. 21, pp. 7426-7431.

Klauder et al., "Coherent States Applications in Physics and Mathematical Physics", World Scientific Publishing Co. Pte. Ltd., 1985, 905 pgs. (presented in 4 parts).

Liu et al., "Full-Field XANES analysis of Roman ceramics to estimate firing conditions—A novel probe to study hierarchical heterogeneous materials", Journal of Analytical Atomic Spectrometry, vol. 28, No. 12, Dec. 2013, pp. 1807-1952.

(56) References Cited

OTHER PUBLICATIONS

Roberts, Stephen, "Parametric and Non-Parametric Unsupervised Cluster Analysis", Patter Recognition, vol. 30, No. 2, 1997, pp. 261-272.
Sciau et al., "Reverse engineering the ancient ceramic technology based on X-ray fluorescence spectromicroscopy", Journal of Analytical Atomic Spectrometry, vol. 26, No. 5, 2011, first published Mar. 11, 2011, pp. 969-976, DOI: 10.1039/COJA00212G.
Shaked, Guy, "Quantum Clustering of Large Data Sets", Thesis, Tel Aviv University, School of Physics and Astronomy, Jan. 2013, 54 pgs.
Shapira et al., "Source parameters and scaling relationships of earthquakes in Israel", Tectonophysics, vol. 217, 1993, pp. 217-226.
Weinstein et al., "Dynamic quantum clustering: A method for visual exploration of structures in data", Physical Review E 80, 066117, 2009.
Meirer et al., "Three-dimensional imaging of chemical phase transformations at the nanoscale with full-field transmission X-ray microscopy", J Synchrotron Radiat., Sep. 1, 2011, vol. 18 (pt.5), pp. 773-781.

\* cited by examiner

SYSTEMS AND METHODS FOR DETERMINING OPTIMAL PARAMETERS FOR DYNAMIC QUANTUM CLUSTERING ANALYSES

CROSS REFERENCE TO RELATED APPLICATIONS

This application claims priority to U.S. Provisional Patent Application No. 61/881,399, filed Sep. 23, 2013 and titled "Visually Exploring Large, Complex Datasets for Hidden Structure" and is a continuation-in-part of U.S. patent application Ser. No. 14/482,961, filed Sep. 10, 2014, which is a continuation of U.S. patent application Ser. No. 12/586,036, filed Sep. 15, 2009, which claims the benefit of U.S. Provisional Patent Application No. 61/198,621, filed Nov. 7, 2008 and titled "Method for Discovering Relationships in Data by Dynamic Quantum Clustering", the disclosures of which are hereby incorporated by reference in their entirety.

GOVERNMENT SPONSORSHIP

This invention was made with US government support under contract number DE-AC02-765F00515 awarded by the Department of Energy. The government has certain rights in this invention.

FIELD OF THE INVENTION

This invention relates to data clustering and more specifically to time-dependent data clustering.

BACKGROUND

Clustering of data is a well-known problem of pattern recognition. For our purposes, data clustering can be formulated as follows. Given a set of data points, one looks for possible structures by sorting out which points are close to each other and, therefore, in some sense belong together. In general, data clustering is often ill-defined in a mathematical sense. Nonetheless, it is a very important problem in many scientific and technological fields of study. Data clustering is a preliminary analysis stage taken before investigating what properties are common to these subsets of the data. Some known approaches for data clustering make use of physical modeling and intuition.

One example of such an approach is known as quantum clustering (as described in US 2004/0117403 and in an article by Horn et al., "Algorithm for Data Clustering in Pattern Recognition Problems Based on Quantum Mechanics", Phys. Rev. Lett. 88 018702 (2001), both of which are hereby incorporated by reference in their entirety). Briefly, in this approach, the data points are used to define a quantum state (e.g., this state can be composed of a linear combination of Gaussians centered at each data point). A potential function having this state as its ground state is calculated from the time-independent Schrödinger equation. The minima of this potential function provide helpful information for data clustering (e.g., in favorable cases, distinct minima of the potential function can identify the clusters). In this approach, there is a single scale parameter, which determines the scale at which cluster structures are identified.

In some cases, the performance of this quantum clustering approach can have an undesirably high sensitivity to the value of the quantum clustering scale parameter. Accordingly, it would be an advance in the art to provide data clustering having reduced parameter sensitivity. While the quantum wave function (i.e. Parzen function) can be quite sensitive to the choice of scale parameter, the details of the quantum potential are much less sensitive to this choice.

SUMMARY OF THE INVENTION

In the present work, quantum clustering is extended to provide a dynamical approach for data clustering using a time-dependent Schrödinger equation. To expedite computations, we can approximate the time-dependent Hamiltonian formalism by a truncated calculation within a set of Gaussian wave-functions (coherent states) centered around the original points. This allows for analytic evaluation of the time evolution of all such states, opening up the possibility of exploration of relationships among data points through observation of varying dynamical-distances among points and convergence of points into clusters. This formalism may be further supplemented by preprocessing, such as dimensional reduction through singular value decomposition and/or feature filtering.

A method for data clustering is an embodiment of the invention. First, n data points are provided as an input to the method. Next, n initial states are defined corresponding to the n data points (e.g., each initial state can be centered on its corresponding data point). A potential function is determined such that a quantum mechanical ground state of the potential function is equal to the sum of the initial states. Quantum mechanical time evolution of the initial states in this potential function is calculated. Data point trajectories are determined from this time evolution (e.g., by computing the position expectations of the evolved states). Information (e.g., point positions, point separations etc.) derived from the trajectories is provided as an output. Preferably, this output is provided by way of an interactive color-coded visual display.

To better appreciate the present approach, it is helpful to compare it to diffusion geometry, which is a known dynamical framework for data clustering (e.g., as described in articles by Coifman et al., Proceedings of the National Academy of Sciences, 102(21), 7432-7437, (2005); Lafon et al., IEEE Transactions on Pattern Analysis and Machine Intelligence, 28, 1393-1403 (2006); Nadler et al., Applied and Computational Harmonic Analysis 21, 113-127, (2006), the entirety of which is hereby incorporated by reference). Diffusion geometry is based on a discrete analog of the heat equation $$i\frac{\partial \Phi}{\partial t} = H\Phi, \qquad (1)$$

where H is some operator with positive eigenvalues, guaranteeing that the temporal evolution of $\Phi(\vec{x},t)$ is that of diffusion. Thus, starting out with $\Phi(\vec{x},0)$, e.g. a Gaussian concentrated around some data point one would expect $\Phi(\vec{x},t)$ to spread over all space that is occupied by the data points. Although dynamic quantum clustering (DQC) and diffusion geometry are both based on models drawn from physics, the underlying physical intuition is quite different in the two cases. Diffusion geometry relies on a random-walk model (i.e., stochastic dynamics), which leads to a diffusion equation for a data point probability density function. In contrast, DQC relies on a quantum-mechanical time evolution (i.e., deterministic dynamics). This can provide deterministic trajectories of data points (e.g., from position expectations).

Data clustering according to the present approach has numerous applications. In biology and medicine, data clustering can provide systematics in plant and animal classifications; analysis of high-throughput experiments, such as DNA microarrays for patient and gene classifications; search for modules of genes in genetic or metabolic networks; and medical image analysis to differentiate types of tissue and blood. In market research and applications, data clustering can provide analysis of multivariate data to determine association of consumer populations and products; and creating relevant data presentations on search engine and/or web sites. Other applications include deciphering structures in mathematical chemistry; using similarity of geological data to evaluate reservoir properties, relating chemical and biological properties in different environments, and analysis of security information.

Systems and methods for dynamic quantum clustering are disclosed. In one embodiment, a method for data clustering includes obtaining a set of source data using a dynamic quantum clustering server system, where the set of source data includes a data dimensionality, assigning a subset of the set of source data to a representational space using the dynamic quantum clustering server system, where the representational space allows a distance between pieces of data in the set of source data to be measured, constructing a potential function based on the representational space and the set of source data using the dynamic quantum clustering server system, computing a projection for the set of source data over a first time interval using the dynamic quantum clustering server system, evaluating the computed projection for the set of source data using the dynamic quantum clustering server system, where the evaluation identifies data clusters including a subset of the set of source data within the computed projection, when a cluster threshold is reached, generating a representation of the computed projection using the dynamic quantum clustering server system, and when the cluster threshold is not reached, iteratively identifying strongly clustered data in the computed projection using the dynamic quantum clustering server system, filtering the strongly clustered data from the set of source data to generate a set of filtered data using the dynamic quantum clustering server system, and computing a second projection for the set of filtered data using the dynamic quantum clustering server system.

In another embodiment of the invention, the method further includes labeling the data clusters using the dynamic quantum clustering server system.

In an additional embodiment of the invention, the data clusters are labeled with color information using the dynamic quantum clustering server system In yet another additional embodiment of the invention, the method further includes preprocessing the set of source data points to reduce the dimensionality of the set of source data using the dynamic quantum clustering server system.

In still another additional embodiment of the invention, the set of source data is preprocessed using singular value decomposition.

In yet still another additional embodiment of the invention, the potential function is determined such that a quantum mechanical ground state of the potential function is equal to the sum of the initial states of the potential function.

In yet another embodiment of the invention, the potential function is constructed as a sum of Gaussian functions centered at each data point in the set of source data.

In still another embodiment of the invention, computing a projection includes computing an expectation value of a quantum mechanical position operator using the dynamic quantum clustering server system.

In yet still another embodiment of the invention, the method further includes displaying the generated representation by providing an interactive visual display of point positions at one or more selected times using the dynamic quantum clustering server system.

In yet another additional embodiment of the invention, the method further includes transmitting the generated representation to a client device configured to provide an interactive visual display of the generated representation.

In still another additional embodiment of the invention, the method further includes obtaining labeling data using the dynamic quantum clustering server system, where the labeling data identifies one or more features of the data clusters.

In yet still another additional embodiment of the invention, the representational space includes a Hilbert space.

In yet another embodiment of the invention, the potential function satisfies a time-independent Schrödinger equation.

In still another embodiment of the invention, the method further includes generating a matrix representation of the obtained source data using the dynamic quantum clustering server system, where the matrix representation is utilized in place of the obtained source data.

In yet still another embodiment of the invention, the potential function includes a set of initial states and the cardinality of the set of initial states is based on the number of data points in the set of source data.

In yet another additional embodiment of the invention, the method further includes generating the filtered data based on the strongly clustered data using the dynamic quantum clustering server system, where the filtered data includes the strongly clustered data and computing the second projection for the set of filtered data using the dynamic quantum clustering server system, where the second projection includes a projection of the strongly clustered data.

In still another additional embodiment of the invention, the strongly clustered data is centered around a local minimum in the representational space.

In yet still another additional embodiment of the invention, the method further includes identifying when at least one piece of strongly clustered data becomes less strongly clustered using the dynamic quantum clustering server system and cease iteratively computing the second projection using the dynamic quantum clustering server system.

Yet another embodiment of the invention includes a non-transitory machine readable medium containing processor instructions, where execution of the instructions by a processor causes the processor to perform a process including obtaining a set of source data, where the set of source data includes a data dimensionality, assigning a subset of the set of source data to a representational space, where the representational space allows a distance between pieces of data in the set of source data to be measured, constructing a potential function based on the representational space and the set of source data, computing a projection for the set of source data over a first time interval, evaluating the computed projection for the set of source data, where the evaluation identifies data clusters including a subset of the set of source data within the computed projection, when a cluster threshold is reached, generating a representation of the computed projection, and when the cluster threshold is not reached, iteratively identifying strongly clustered data in the computed projection, filtering the strongly clustered data from the set of source data to generate a set of filtered data, and computing a second projection for the set of filtered data.

Still another embodiment of the invention includes a dynamic quantum clustering server system including a processor and a memory storing a relationship identification application, wherein the relationship identification application directs the processor to obtain a set of source data, where the set of source data includes a data dimensionality, assign a subset of the set of source data to a representational space, where the representational space allows a distance between pieces of data in the set of source data to be measured, construct a potential function based on the representational space and the set of source data, compute a projection for the set of source data over a first time interval, evaluate the computed projection for the set of source data, where the evaluation identifies data clusters including a subset of the set of source data within the computed projection, when a cluster threshold is reached, generate a representation of the computed projection, and when the cluster threshold is not reached, iteratively identify strongly clustered data in the computed projection, filter the strongly clustered data from the set of source data to generate a set of filtered data, and compute a second projection for the set of filtered data.

DETAILED DESCRIPTION

Figure 1:
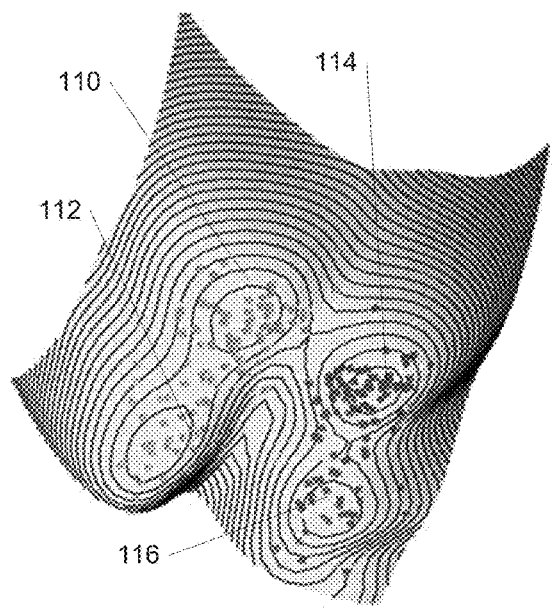
FIG. 1 is a plot of a quantum potential function relating to a quantum clustering example.

Turning now to the drawings, systems and methods for dynamic quantum clustering in accordance with embodiments of the invention are described. Dynamic quantum clustering (DQC) can be flexibly applied to datasets that present significantly different challenges, we also show how a simple analysis can be used to look for the needle in the haystack, determine what it is, and find what this means. In this work, we advocate the use of a Schrödinger Hamiltonian $\hat{H}$ that is intimately connected to the data-structure, as defined by the quantum clustering method summarized below. We extend it into a time-dependent Schrödinger equation:

$$i\frac{\partial \psi(\vec{x}, t)}{\partial t} = \hat{H}\psi(\vec{x}, t) \qquad (2)$$

The ensuing DQC formalism allows us, by varying a few parameters, to study in detail the temporal evolution of wave-functions representing the original data points. In turn, this dynamical behavior allows us to explore the structure of the quantum potential function defined by the quantum clustering method.

DQC begins by associating each data point with a state in Hilbert space. The temporal development of the centroids of these states may be viewed in the original data space as moving images of the original points. Their distances to each other change with time, thus representing associations they form with each other. Convergence of many points onto a common center at some instant of time is a clear manifestation of clustering. Many transitional relationships may occur, revealing substructures in clusters or even more complex associations. For this reason, we propose this approach as a general method for visually and interactively searching for and exploring structures in sets of data. Additionally, DQC can be utilized in a variety of data classification and identification contexts, such as feature selection for a set of data, identifying solutions to optimization problems, training classifiers and classifying additional data, and a variety of other contexts as appropriate to the requirements of specific applications of embodiments of the invention.

Quantum Clustering

The quantum clustering approach begins, as does the well-known Parzen-window estimator, by associating to each of n data points $\vec{x}_i$ in a Euclidean space of d dimensions a Gaussian wave-function $$\psi_i(\vec{x}) = e^{-\frac{(\vec{x}-\vec{x}_i)^2}{2\sigma^2}}$$

and then constructing the sum of all these Gaussians, $$\psi(\vec{x}) = \sum_i e^{-\frac{(\vec{x}-\vec{x}_i)^2}{2\sigma^2}} \quad (3)$$

Conventional scale-space clustering views this function as a probability distribution (up to an overall factor) that could have generated the observed points, and regards therefore its maxima as determining locations of cluster centers. Often these maxima are not very prominent and, in order to uncover more of them, one has to reduce σ down to low values where the number and location of the maxima depend sensitively upon the choice of σ.

Quantum clustering took a different approach, requiring ψ to be the ground-state of the Hamiltonian $$\hat{H}\psi \equiv \left(-\frac{\sigma^2}{2}\nabla^2 + V(\vec{x})\right)\psi = E_0\psi \quad (4)$$

By positing this requirement, the potential function $V(\vec{x})$ has become inextricably bound to the system of data points, since $V(\vec{x})$ is determined, up to a constant, by an algebraic inversion of Eq. 4. Moreover, one may expect V to have minima in regions where ψ has maxima and furthermore, that these minima will be more pronounced than the corresponding maxima found in the Parzen estimator. In fact, it frequently turns out that a concentration of data points will lead to a local minimum in V, even if ψ does not display a local maximum. Thus, by replacing the problem of finding maxima of the Parzen estimator by the problem of locating the minima of the associated potential, $V(\vec{x})$, we simplify the process of identifying clusters. The effectiveness of quantum clustering has been demonstrated, e.g., as described in the above-cited article by Horn et al. It should be noted that the enhancement of features obtained by applying Eq. 4 comes from the interplay of two effects: attraction of the wave-function to the minima of V and spreading of the wave-function due to the second derivative (kinetic term). This may be viewed as an alternative model to the conventional probabilistic approach, incorporating attraction to cluster-centers and creation of noise, both inferred from—or realized by—the given experimental data.

DQC drops the probabilistic interpretation of ψ and replaces it by that of a probability-amplitude, as customary in Quantum Mechanics. DQC is set up to associate data points with cluster centers in a natural fashion. Whereas in QC this association was done by finding their loci on the slopes of V, here we follow the quantum-mechanical temporal evolvement of states associated with these points. Specifically, we will view each data point as the expectation value of the position operator in a Gaussian wave-function $$\psi_i(\vec{x}) = e^{-\frac{(\vec{x}-\vec{x}_i)^2}{2\sigma^2}};$$

the temporal development of this state traces the association of the data point it represents with the minima of $V(\vec{x})$ and thus, with the other data points. Additional techniques for optimizing the parameters utilized in the DQC analysis are described in more detail below.

Dynamic Quantum Clustering (DQC)

As we already noted, the conversion of the static QC method to a full dynamical one, begins by focusing attention on the Gaussian wave-function, $$C\psi_i(\vec{x}) = e^{-\frac{(\vec{x}-\vec{x}_i)^2}{2\sigma^2}},$$

associated with the $i^{th}$ data point, where C is the appropriate normalization factor. Thus, by construction, the expectation value of the operator $\vec{x}$ in this state is simply the coordinates of the original data point; i.e., $$\vec{x}_i = \langle \psi_i | \vec{x} | \psi_i \rangle = \int d\vec{x}\, \psi_i^*(\vec{x})\vec{x}\psi_i(\vec{x}) \quad (5)$$

The dynamical part of the DQC algorithm is that, having constructed the potential function $V(\vec{x})$, we study the time evolution of each state $\psi_i(\vec{x})$ as determined by the time dependent Schrödinger equation; i.e., $$i\frac{\partial \psi_i(\vec{x},t)}{\partial t} = \hat{H}\psi_i(\vec{x},t) = \left(-\frac{\nabla^2}{2m} + V(\vec{x})\right)\psi_i(\vec{x},t) \quad (6)$$

where m is an arbitrarily chosen mass for a particle moving in d-dimensions. If we set $m=1/\sigma^2$ then, by construction, $\psi(\vec{x})$ of Eq. 3 is the lowest energy eigenstate of the Hamiltonian. If m is chosen to have a different value, then not only does each individual state $\psi_i(\vec{x})$ evolve in time, but so does the sum of the states, $\psi(\vec{x})$.

The important feature of quantum dynamics, which makes the evolution so useful in the clustering problem, is that according to Ehrenfest's theorem, the time-dependent expectation value $$\langle \psi_i(t) | \vec{x} | \psi_i(t) \rangle = \int d\vec{x}\, \psi_i^*(\vec{x},t)\vec{x}\psi_i(\vec{x},t) \quad (7)$$

satisfies the equation, $$\frac{d^2 \langle \vec{x}(t) \rangle}{dt^2} = -\frac{1}{m}\int d\vec{x}\, \psi_i^*(\vec{x},t)\vec{\nabla} V(\vec{x})\psi_i(\vec{x},t) \quad (8)$$

-continued $$= \langle \psi_i(t) | \vec{\nabla} V(\vec{x}) | \psi_i(t) \rangle \qquad (9)$$

If $\psi_i(\vec{x})$ is a narrow Gaussian, this is equivalent to saying that the center of each wave-function rolls towards the nearest minimum of the potential according to the classical Newton's law of motion. This means we can explore the relation of this data point to the minima of $V(\vec{x})$ by following the time-dependent trajectory $$\langle \vec{x}_i(t) \rangle = \langle \psi_i(t) | \vec{x} | \psi_i(t) \rangle.$$

Clearly, given Ehrenfest's theorem, we expect to see any points located in, or near, the same local minimum of $V(\vec{x})$ to oscillate about that minimum, coming together and moving apart. In our numerical solutions, we generate animations that display this dynamics for a finite time. This allows us to visually trace the clustering of points associated with each one of the potential minima.

In the above-cited paper by Horn et al., classical gradient descent was successfully used to cluster data by moving points (on classical trajectories) to the nearest local minimum of $V(\vec{x})$. The idea being that points which end up at the same minimum are in the same cluster. At first glance, it would seem that DQC replaces the conceptually simple problem of implementing gradient descent with the more difficult one of solving complicated partial differential equations. We will show the difficulty is only apparent. In fact, the solution of the Schrödinger equation can be simplified considerably and allow further insights than the gradient descent method.

The DQC algorithm translates the problem of solving the Schrödinger equation into a matrix form which captures most of the details of the analytic problem, but which involves N×N matrices whose dimension, N, is less than or equal to the number of data points. This reduction is independent of the data-dimension of the original problem. From a computational point of view, there are many advantages to this approach. First, the formulas for constructing the mapping of the original problem to a matrix problem are all analytic and easy to evaluate, thus computing the relevant reduction is fast. Second, the evolution process only involves matrix multiplications, so many data points can be evolved simultaneously and, on a multi-core processor, in parallel. Third the time involved in producing the animations showing how the points move in data space scales linearly with the number of dimensions to be displayed. Finally, by introducing an m that is different from $1/\sigma^2$ we allow ourselves the freedom of employing low σ, which introduces large numbers of minima into V, yet also having a low value for m that guarantees efficient tunneling, thus connecting points that may be located in nearby, nearly degenerate potential minima. By using this more general Hamiltonian, we reduce the sensitivity of the calculation to the specific choice of σ.

A process for dynamic quantum clustering in accordance with an embodiment of the invention is shown in FIG. 12. The process 1200 includes obtaining (1210) source data. Source data is assigned (1212) to a conceptual space, a potential function is constructed (1214), and one or more positions are calculated (1216) over a time interval. Data clusters are evaluated (1218), and if a cluster threshold is reached (1220), the data clusters can be labeled (1222). If the cluster threshold is not reached (1220), additional positions are calculated (1216) over additional time intervals and additional data clusters are evaluated (1218). However, it should be noted that any processes not specifically described above, including those that omit one or more functions or utilize different techniques than those described above, can be utilized in accordance with the requirements of specific applications of embodiments of the invention.

One final point worth making before describing the method of calculation is that the use of Gaussian wave functions to represent data points allows us to develop a number of flexible strategies for handling very large data sets. This issue will be addressed below.

The Calculation Method

Before discussing how this method works in practice, we will give a brief outline of the details of the general procedure. We begin by assuming that there are n data points that we wish to cluster. To these data points we associate n states, $|\psi_i\rangle$. These states are n Gaussian wave-functions such that the $i^{th}$ Gaussian is centered on the coordinates of the $i^{th}$ data point. These states form a basis for the vector space within which we calculate the evolution of our model.

Let us denote by N, the n×n matrix formed from the scalar products $$N_{i,j} = \langle \psi_i | \psi_j \rangle \qquad (10)$$

and by H, the n×n matrix $$H_{i,j} = \langle \psi_i | \hat{H} | \psi_j \rangle \qquad (11)$$

and by $\vec{X}_{i,j}$ the matrix of expectation values $$\vec{X}_{i,j} = \langle \psi_i | \vec{x} | \psi_j \rangle \qquad (12)$$

The calculation process can be described in five steps. First, begin by finding the eigenvectors of the symmetric matrix N which correspond to states having eigenvalues larger than some pre-assigned value; e.g., $10^{-5}$. These vectors are linear combinations of the original Gaussians that form an orthonormal set. Second, compute H in this orthonormal basis, $H^{tr}$. Do the same for $\vec{X}_{i,j}$. Fourth, find the eigenvectors and eigenvalues of $H^{tr}$, construct $|\psi_i(t)\rangle = e^{-itH^{tr}}|\psi\rangle$ that is the solution to the reduced time dependent Schrödinger problem $$i\frac{\partial}{\partial t}|\psi_i(t)\rangle = H^*|\psi_i(t)\rangle \qquad (13)$$

such that $|\psi_i(t=0)\rangle = |\psi_i\rangle$. Finally, construct the desired trajectories $$\langle \vec{x}_i(t) \rangle = \langle \psi_i | e^{itH^{tr}} \vec{X} e^{-itH^{tr}} | \psi_i \rangle \qquad (14)$$

by evaluating this expression for a range of t and use them to create an animation. Stop the animation when clustering of points is apparent.

It is clear that restricting attention to the truncated Hamiltonian perforce loses some features of the original problem, however its advantage is that we can derive analytic expressions for all operators involved (see Appendices A and B). As a result, the numerical computations can be done very quickly. Experience has shown that as far as clustering is concerned this approximation causes no difficulties.

Example: Ripley's Crab Data

To test our method we apply it to a five-dimensional dataset with two hundred entries, used in Ripley's text book (B. D. Ripley, "Pattern Recognition and Neural Networks", Cambridge University Press, Cambridge UK, 1996, hereby incorporated by reference in its entirety). This dataset records five measurements made on male and female crabs that belong to two different species. This dataset has been used in the original paper on quantum clustering by Horn et al. cited above. It is being used here to allow readers to compare the two techniques. Applications to other data sets will be discussed below. Our main motivation is to provide a simple example that exhibits the details of the DQC method. In particular, we wish to show that the simplest computational scheme for implementing the general program captures the essential features of the problem and does as well as one can reasonably expect to do.

The data is stored in a matrix M which has 200 rows and 5 columns. Following an often-used dimensional reduction method, we preprocess our data with a singular-value decomposition $$M = USV^\dagger \quad (15)$$

where U is a unitary 200×200 matrix and S is the 200×5 matrix of singular values, the latter occurring on the diagonal of its upper 5×5 entries. The sub-matrix of U consisting of the first five columns, the so-called five Principal Components (PCs), can be thought of as assigning to each sample a unique point in a five-dimensional vector space. We may study the problem in the full five-dimensional space or within any subspace by selecting appropriate principal components. In the above cited article by Horn et al., QC was applied to this problem in a 2-dimensional subspace, consisting of PC2 and PC3. In what follows, we will discuss the application of DQC to the 3-dimensional data composed of the first three PCs (although there would be no change in the results if we used all five dimensions).

In order to give the reader some feeling for how the quantum potential associated with the data looks in a simple case, we have included FIG. 1 where we exhibit the original data points with different colors of points correspond to known classes (green 110, orange 112, blue 114, red 116), placed upon the associated two-dimensional quantum potential, where the coordinates of the data points are chosen to be given by the second and third principal components. As is apparent from the plot the minima of the potential function do a very good job of capturing the different clusters. Moreover, letting data points roll downhill to the nearest minimum will produce a reasonable separation of the clusters.

Clearly, when we restrict attention to the first three PCs, the rows of the matrix obtained by restricting U to its first three columns are not guaranteed to be normalized to unity. Hence, we employ the conventional approach of projecting all points onto the unit sphere.

In what follows we study the temporal behavior of the curves $\{\vec{x}_i(t)\}$, for all i. Henceforth we will refer to this as the "motion of points".

Figure 2A:
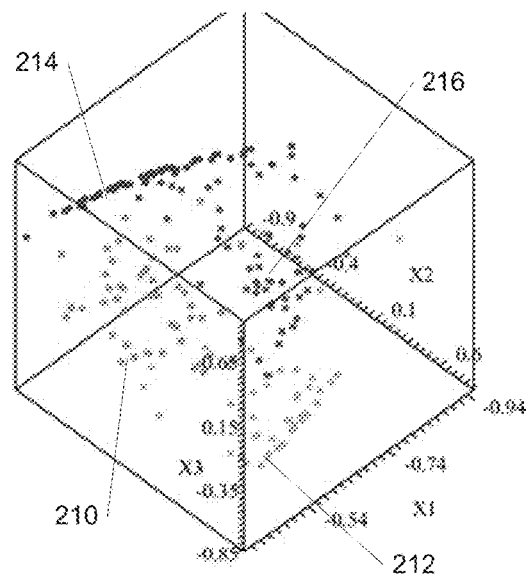
FIGS. 2A-C show initial (a), intermediate (b) and final (c) point positions relating to a dynamic quantum clustering example.

FIG. 2A shows the distribution of the original data points plotted on the unit sphere in three dimensions. This is the configuration before we begin the dynamic quantum evolution. To visually display the quality of the separation we have colored the data according to its known four classes, however this information is not incorporated into our unsupervised method. To begin with, we see that the two species of crabs ((red 216, blue 214) and (orange 212, green 210)) are fairly well separated; however, separating the sexes in each species is problematic.

Figure 2B:
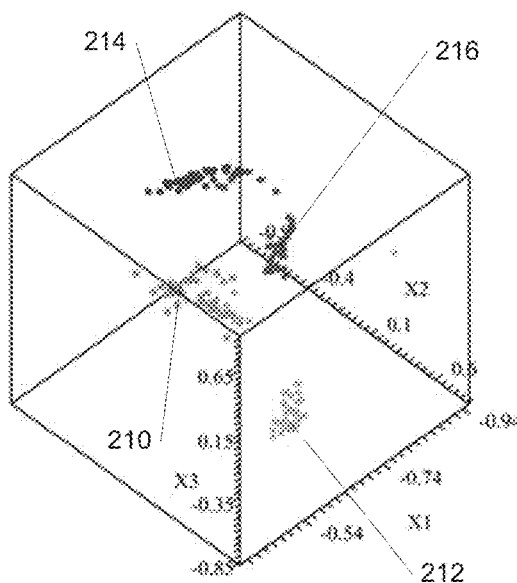

FIG. 2B shows the distribution of the points after a single stage of quantum evolution, stopped at a time when points first cross one another and some convergence into clusters has occurred. It is immediately apparent that the quantum evolution has enhanced the clustering and made it trivial to separate clusters by eye. Once separation is accomplished, extracting the clusters can be performed by eye from the plots or by any conventional technique, e.g. k-means.

Figure 2C:
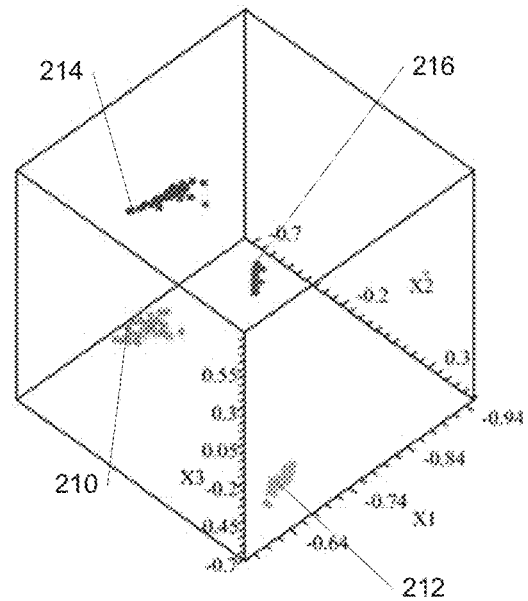

FIG. 2C shows the results of an additional iteration of DQC. In this example, the values of parameters used to construct the Hamiltonian and evolution operator are σ=0.07 and m=0.2. Colors indicate the expert classification of data into four classes, unknown to the clustering algorithm. Note, small modifications of the parameters lead to the same results.

Figure 3A:
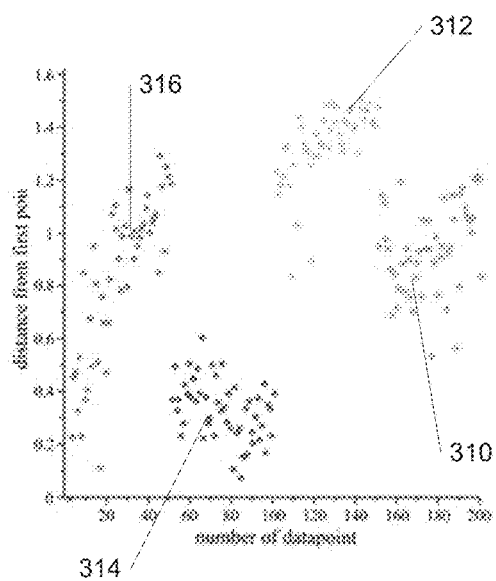
FIGS. 3A-C show initial (a), intermediate (b) and final (c) point separations from the first point relating to a dynamic quantum clustering example.
Figure 3B:
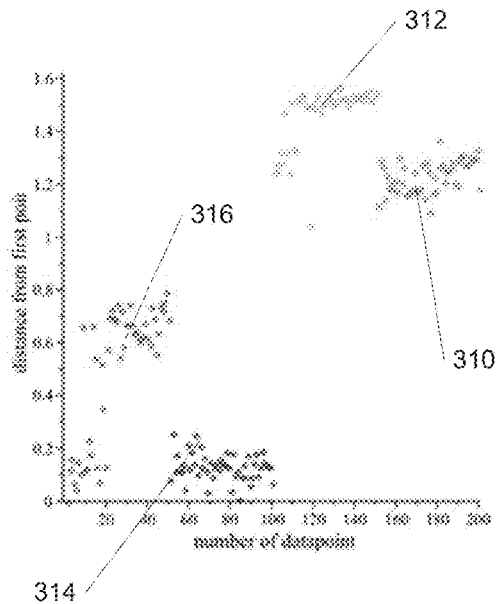
Figure 3C:
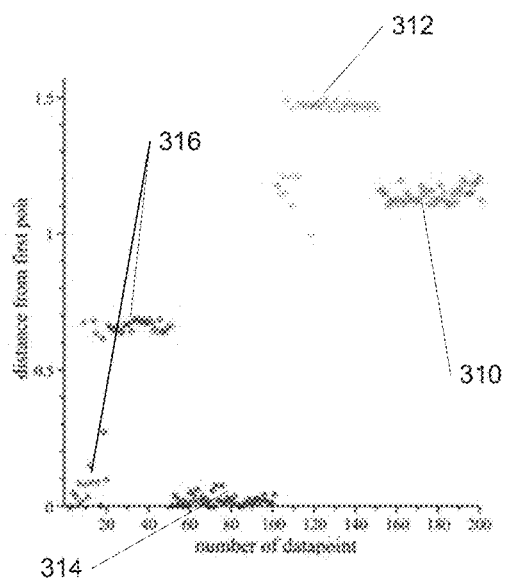

An alternative way of displaying convergence is shown in FIGS. 3A-C, where we plot the Euclidean distance from the first point in the dataset to each of the other points. FIG. 3A shows the distances for the initial distribution of points. FIG. 3B shows the same distances after quantum evolution. FIG. 3C shows results after another iteration of DQC. The numbering of the data points is ordered according to the expert classification of these points into four classes (red 316, blue 314, orange 312, green 310) containing 50 instances each.

The clusters lie in bands that have approximately the same distance from the first point. It is difficult to get very tight clusters since the points, while moving toward cluster centers, oscillate around them, and arrive at the minima at slightly different times. Given this intuition, it is clear that one way to tighten up the pattern is to stop DQC evolution at a point where the clusters become distinct, and then restart it with the new configuration, but with the points redefined at rest. We refer to this as iterating the DQC evolution. When iterating the DQC evolution, a new potential V is computed based on the current point positions, then DQC evolution is performed in the new potential. FIGS. 2C and 3C show what happens when we do this. The second stage of evolution clearly tightens up the clusters significantly, as was expected.

By the end of the second iteration, there can be no question that it is a simple matter to extract the clusters. As is quite evident, clustering does not agree completely with the expert classification, i.e. points with different colors may be grouped together. This is, however, the best one can do by color-blind treatment of the information provided in the data-matrix. As we already noted, the full 5-dimensional study of the crab data-set can proceed in the same manner, although it does not lead to new insights.

Dynamic Distances

The fact that data points of different classes happen to lie close to each other in the data-matrix can be due to various factors: errors in data measurements, errors in the expert assignment to classes, true proximity of data points in spite of differences of origin (extreme example would be similarities of phenotypes in spite of differences in genotypes) or—the simplest possibility—the absence of some discriminative features in the feature-space that spans the data measurements. However, there is another important conceptual message to be learned here—clustering and/or classification may not capture all the interesting lessons that may be derived from the data. A similar message is included in the above-described Diffusion Geometry approach that advocates measuring diffusion-distances among points rather than Euclidean ones. Diffusion distances are influenced by the existence of all other points. In our DQC analysis this may be replaced in a straightforward manner by defining dynamic distances among points $$d_{i,j}(t) = \|\langle \vec{x}_i(t)\langle - \rangle \vec{x}_j(t)\rangle\| \quad (16)$$

with the norm being Euclidean or any other suitable choice.

Clearly $d_{i,j}(0)$ is the geometric distance as given by the original data-matrix or by its reduced form that is being investigated. As DQC evolves with time $d_{i,j}(t)$ changes, and when some semi-perfect clustering is obtained, it will be close to zero for points that belong to the same cluster. FIGS. 3A-C show this change in time for all $d_{i,1}(t)$ in the crab-data example studied above. It is apparent that, in addition to the few cases in which clustering disagrees with classification, there are many intermediate steps where different data points are close to each other in spite of eventually evolving into different clusters and belonging to different classes. Thus a close scrutiny of the dynamic distances matrix $d_{i,j}(t)$ may lead to interesting observations regarding the relationships among individual pairs of points in the original data, a relationship that is brought out by DQC as result of the existing information about all other data points. It may be used to further investigate the reason for such proximities, along any one of the lines mentioned above, and thus may lead to novel insights regarding the problem at hand.

Analysis of Large Data Sets

There are many scientific and commercial fields, such as cosmology, epidemiology, and risk-management, where the data sets of interest contain many points, often also in large numbers of dimensions. We have already discussed how to overcome the problem of large dimensions. Dealing with large number of points requires yet a new angle. In problems of this sort it is clear from the outset that, especially on a personal computer (PC), diagonalizing matrices which are larger than 2000×2000 is computationally intensive. It is clear that using brute force methods to evolve sets of data having tens of thousands of points simply will not work. The solution to the problem of dealing with sets of data containing tens of thousands of entries each with N features, lies in the fact that the Singular Value Decomposition (SVD) decomposition maps the data into an N-dimensional cube, and the fact that the data points are represented by states in Hilbert space rather than N-tuples of real numbers. Since there is a literature on ways to do SVD decomposition for large sets of data, we will not address this point here. What we do wish to discuss is how to exploit the representation of data points as states in Hilbert space in order to evolve large sets of data.

The trick is to observe that since Gaussian wave-functions whose centers lie within a given cube have non-vanishing overlaps, as one chooses more and more wave-functions one eventually arrives at a situation where the states become what we will refer to as essentially linearly dependent. In other words, we arrive at a stage at which any new wave-function added to the set can, to some predetermined accuracy, be expressed as a linear combination of the wave-functions we already have. Of course, since quantum mechanical time evolution is a linear process, this means that this additional state (which can be regarded as an auxiliary state) can be evolved by expressing it as a linear combination of the previously selected states and evolving them. Since computing the overlap of two Gaussians is done analytically (Appendix B) determining which points determine the set of maximally essentially linearly independent states for the problem is easy. Typically, even for data sets with 35,000 points, this is of the order of 1000 points. This works because, as we have already noted, we do not need high accuracy for DQC evolution. The quality of the clustering degrades very slowly with loss in accuracy. Thus, we can compute the time evolution operator in terms of a well-chosen subset of the data and then apply it to the whole set of points. This is particularly attractive for new multi-core PCs and for computer clusters, since it is possible, even in high-level languages, to write multi-threaded programs that farm the multiplication of large numbers of vectors out to different processors. This means that one can achieve a great improvement in the speed of the computation for very little additional work.

To demonstrate this versatility of DQC we have analyzed a set of 35,213 points in 20 dimensions. We are grateful to JoAnne Hewett and Tom Rizzo for providing us with this example. The points in the plot represent sample super-symmetric models for physics beyond the Standard Model that satisfy all experimental constraints in a parameter space of twenty dimensions. This data-set definitely shows some non-trivial variations in density that can be made apparent by a visual inspection of the data plotted in different dimensional combinations. However, DQC is needed to obtain good visual deciphering of the different structures. Selecting a subset of 1200 points, whose Gaussians we consider to be a set of essentially linearly independent states for the problem, we construct $H''$. By expanding the remaining states in terms of these 1200 states we can easily evaluate the DQC evolution of all 35,213 points. The results are displayed in FIGS. 4A-D.

Figure 4A:
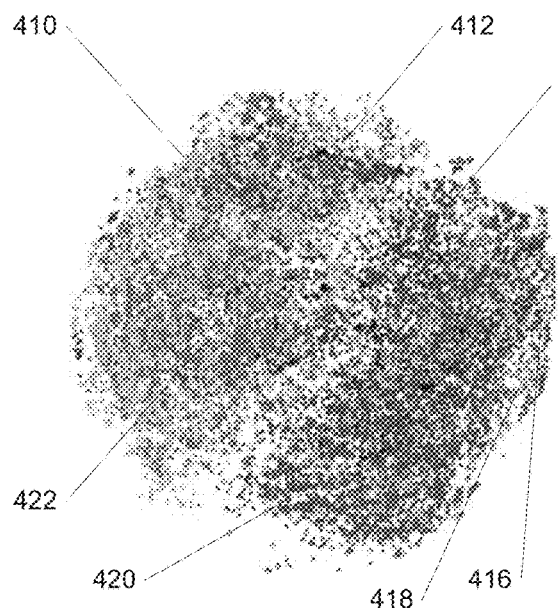
FIGS. 4A-D show initial (a), intermediate (b and c) and final (d) point positions relating to a dynamic quantum clustering example of a large and high-dimensional data set.
Figure 4B:
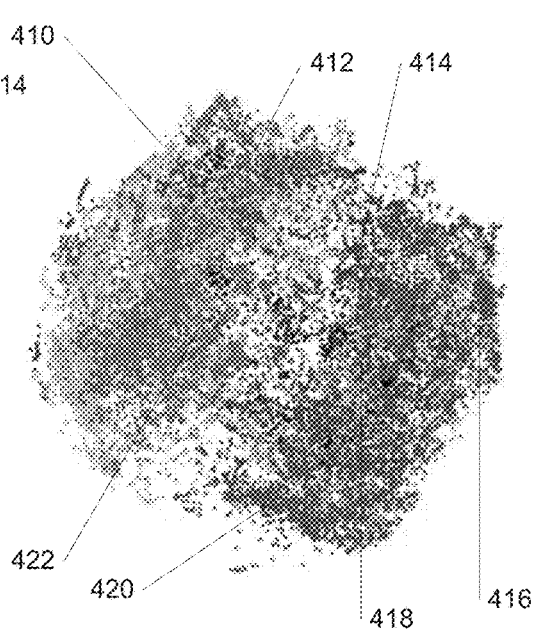
Figure 4C:
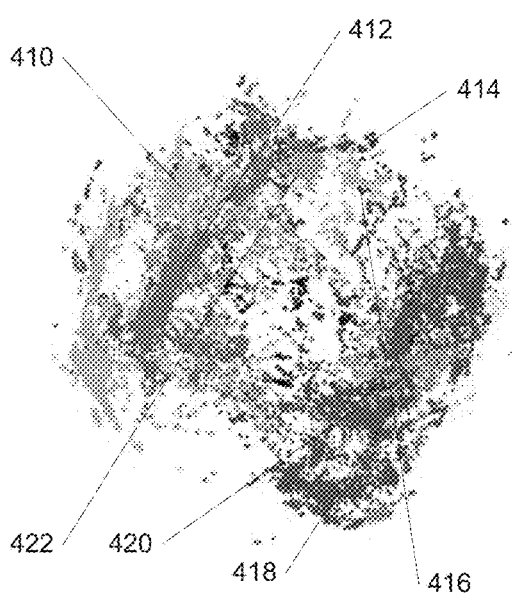
Figure 4D:
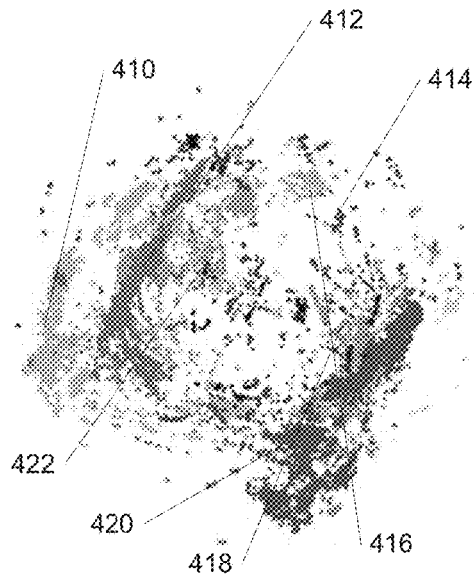

More specifically, FIGS. 4A-D are plots of the first three principal components for this large data-set, before and after DQC evolution. Three stages of DQC development are shown. Thus, FIG. 4A is the initial configuration, FIG. 4B is after one iteration of DQC, FIG. 4C is after 2 iterations of DQC, and FIG. 4D is after 3 iterations of DQC. The coloring was decided upon by selecting the most apparent clusters from the evolved data and assigning colors to them—light blue 410, pink 412, orange 416, green 418, red 420, and gray 422. The dark blue points 414 correspond to points that were not assigned to clusters. The purpose of coloring is to be able to look at the points in the original data, discern those that belong to common structures, and follow their dynamic distances under DQC evolution.

It seems very clear how the structures develop with DQC. Using the last DQC stage, it is possible to identify the main structures and assign each substructure a different color. One can then examine the colored version of a plot of the individual data points, discern the structures that belong together, and follow the DQC development tracing out dynamic distances between the different points and structures in all dimensions.

Interplay of Feature Selection with DQC

Data exploration involves not only the instances, or data points, but also the features (coordinates) with which the instances are defined. By performing SVD, and selecting a subset of coordinates, we define superpositions of the original features within which we search for clustering of the instances. In problems with very many features, it is advantageous to also perform some feature filtering, employing a judicious selection of subsets of the original features. Clearly, the effectiveness of preprocessing data using some method for selecting important features is well appreciated. What we wish to show in this discussion is how easily one distinguishes the effects of feature filtering in our visual approach and how easy it is, in problems where one has an expert classification, to see if the unsupervised method used to select important features is working well. Furthermore, we wish to show the power of combining iterations of an SVD based feature filtering algorithm in conjunction with iterations of DQC. To do this we will show what happens when one applies these ideas to the dataset of Golub et al. (Molecular Classification of Cancer: Class Discovery and Class Prediction by Gene Expression Monitoring. Science 286 531 (1999), hereby incorporated by reference in its entirety).

The Golub et al. dataset contains gene chip measurements on cells from 72 leukemia patients with two different types of Leukemia, ALL and AML. The expert identification of the classes in this data set is based upon dividing the ALL set into two subsets corresponding to T-cell and B-cell Leukemia. The AML set is divided into patients who underwent treatment and those who did not. In total, the apparatus used in this experiment measured the expression of 7129 genes. The feature filtering method we employ is based on SVD-entropy, and is a simple modification of a method introduced by Varshaysky et al. (Novel Unsupervised Feature Filtering of Biological Data, Bioinformatics 22 no. 14 (2006), e507-e513, hereby incorporated by reference in its entirety) and applied to the same data.

The method begins by computing the SVD-based entropy of a dataset M (matrix of n instances by m features of Eq. 15) based on the eigenvalues $s_j$ of its diagonal matrix S. Defining normalized relative variance values $$v_j = \frac{s_j^2}{\sum_k s_k^2},$$

the dataset entropy is defined through $$E = -\frac{1}{\log r} \sum_{j=1}^{r} v_j \log(v_j) \quad (17)$$

where r is the rank of the data-matrix, typically much smaller than m. Given the dataset entropy of the matrix M, define the contribution of the $i^{th}$ feature to the entropy using a leave-one-out comparison; i.e., for each feature we construct the quantity $$CE_i = E(M_{(n \times m)}) - E(M_{(n \times (m-1))}) \quad (18)$$

where the second entropy is computed for the matrix with the $i^{th}$ feature removed. Our filtering technique will be to remove all features for which $CE_i \leq 0$.

Figure 5A:
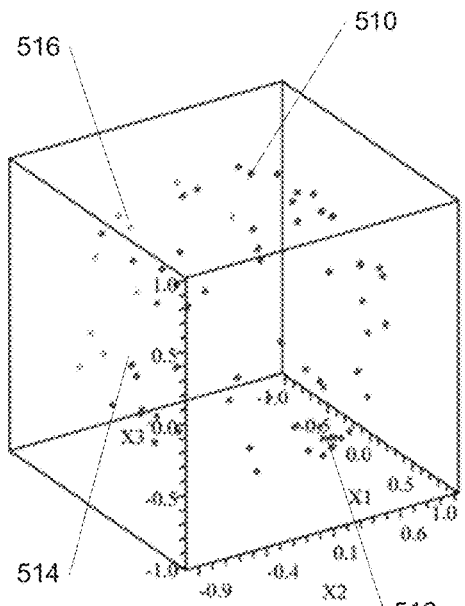
FIGS. 5A-B show initial (a) and final (b) point positions relating to a dynamic quantum clustering example.
Figure 5B:
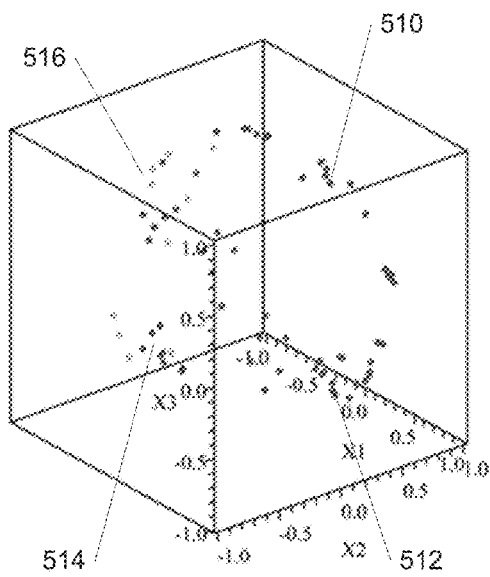

FIG. 5A displays the raw data for this example in the 3-dimensional space defined by PCs 2 to 4. FIG. 5B displays the effect that DQC has on these data, using σ=0.2 and a mass m=0.01. The different classes are shown as blue 510, red 512, green 514 and orange 516. Clearly, without the coloring it would be hard to identify clusters.

Figure 6A:
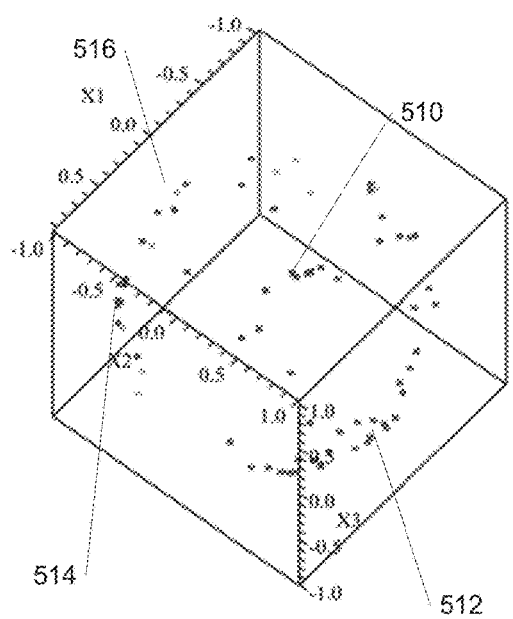
FIGS. 6A-B show initial (a) and final (b) point positions relating to a dynamic quantum clustering example.
Figure 6B:
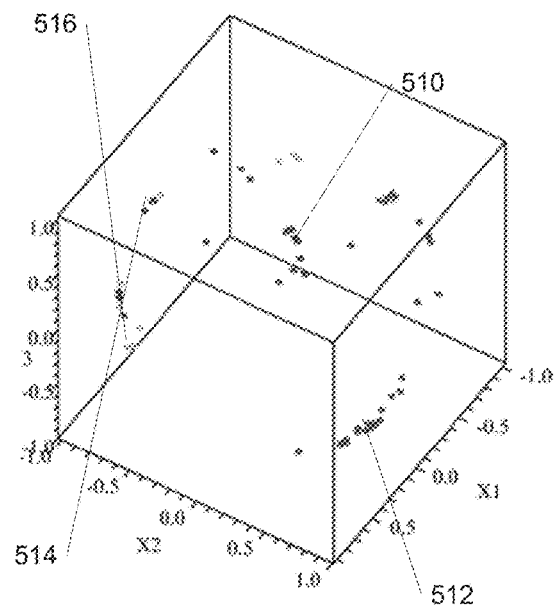

In FIGS. 6A-B we see the result of applying feature filtering to the original data, represented in the same 3 dimensions, followed by DQC evolution. FIG. 6A is the Golub data after one stage of SVD-entropy based filtering, but before DQC evolution. FIG. 6B is the same data after DQC evolution. Applying a single stage of filtering has a dramatic effect upon clustering, even before DQC evolution. The latter helps sharpening the cluster separation.

Figure 7A:
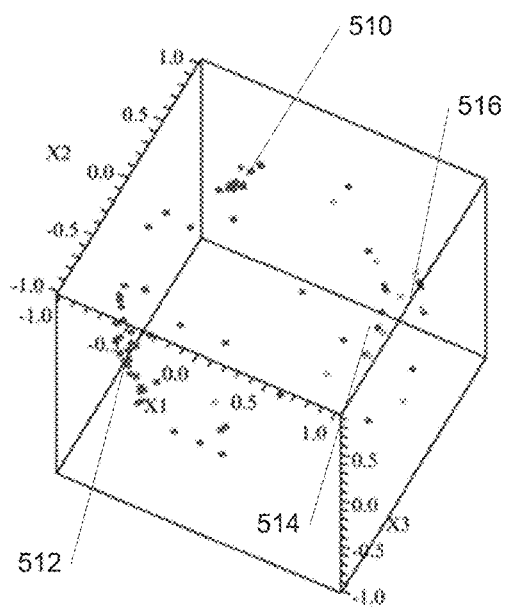
FIGS. 7A-B show initial (a) and final (b) point positions relating to a dynamic quantum clustering example.
Figure 7B:
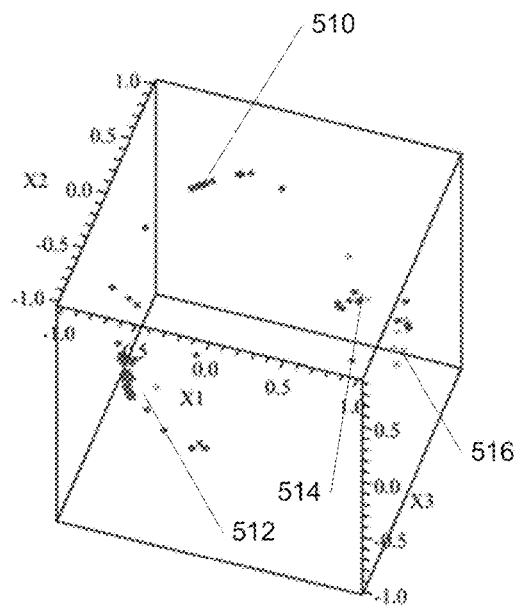

FIGS. 7A-B show the results of three iterations of SVD-entropy, before and after DQC evolution. FIG. 7A is the data after three stages of SVD-entropy based filtering, but before DQC evolution. FIG. 7B is the same data after DQC evolution. These plots, especially the after DQC pictures, show dramatic clustering, especially for the blue points 510. With each stage of filtering, we see that the blue points 510 cluster better and better, in that the single red outlier 512 separates from the cluster and the cluster separates more and more from the other points. The blue points 510 are what we will refer to as a clearly robust cluster that has been identified in early stages of filtering. If one continues iterating past the fifth stage, however, the clear separation of the blue points 512 from the others (512, 514, 516) begins to diminish. Thus, we see that the SVD-entropy based filtering, in trying to enhance the clumping of the red points, starts throwing away those features that make the blue cluster distinct. Since this effect is quite pronounced we would say that features that are important to distinguishing the blue cluster from the others begin to be removed at the sixth and higher iterations of filtering. This is, of course, just what we are looking for, a way of identifying those features that are important to the existing biological clustering. Out of the original 7129 features, we have reduced ourselves to 2766 features by the fifth iteration. In going from step five to step six this gets further reduced to 2488 features, so we could begin searching among the 278 eliminated features to isolate those most responsible for the separation of the blue cluster from the others. Instead, we will take another track and, since it is so robust and easily identified, remove the blue cluster from the original data and repeat the same process without this cluster. The idea here is that now the SVD-entropy based filtering will not be pulled by the blue cluster and so it will do a better job of sorting out the red, green, and orange clusters. As we will see, this is in fact the case.

Figure 8A:
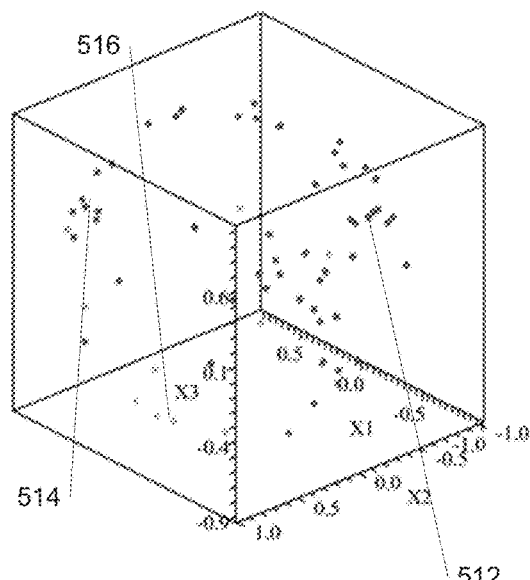
FIGS. 8A-B show intermediate (a) and final (b) point positions relating to a SVD-entropy clustering example.
Figure 8B:
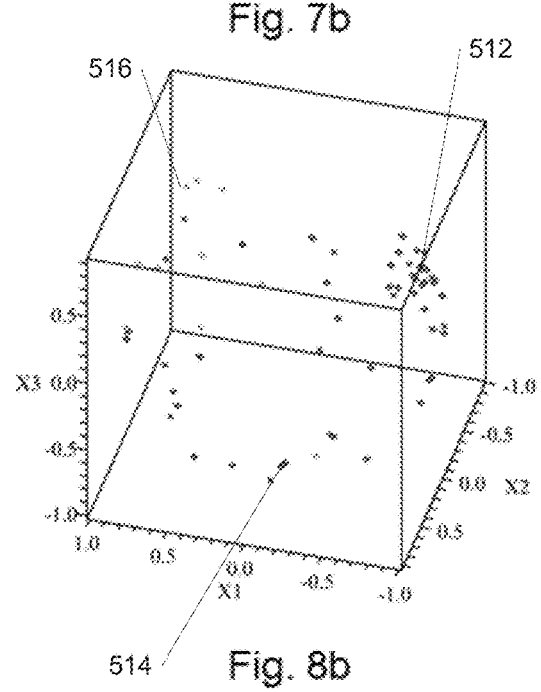

In FIGS. 8A-B we see plots of what the starting configurations look like if one takes the original data, removes the identified blue cluster 510 and re-sorts the reduced data set according to the SVD-entropy based filtering rules. FIG. 8A is what happens if one filters a single time, removing those features, i, whose one-left-out comparison, $CE_i$, is less than or equal to zero. FIG. 8B shows what happens if one repeats this procedure two more times, each time removing features for which $CE_i \leq 0$. There is no problem seeing that each iteration of the SVD-entropy based filtering step improves the separation of the starting clusters. By the time we have done five SVD-entropy based filtering steps the red 512, green 514, and orange 516 clusters are distinct, if not clearly separated.

Figures 9A, 9B:
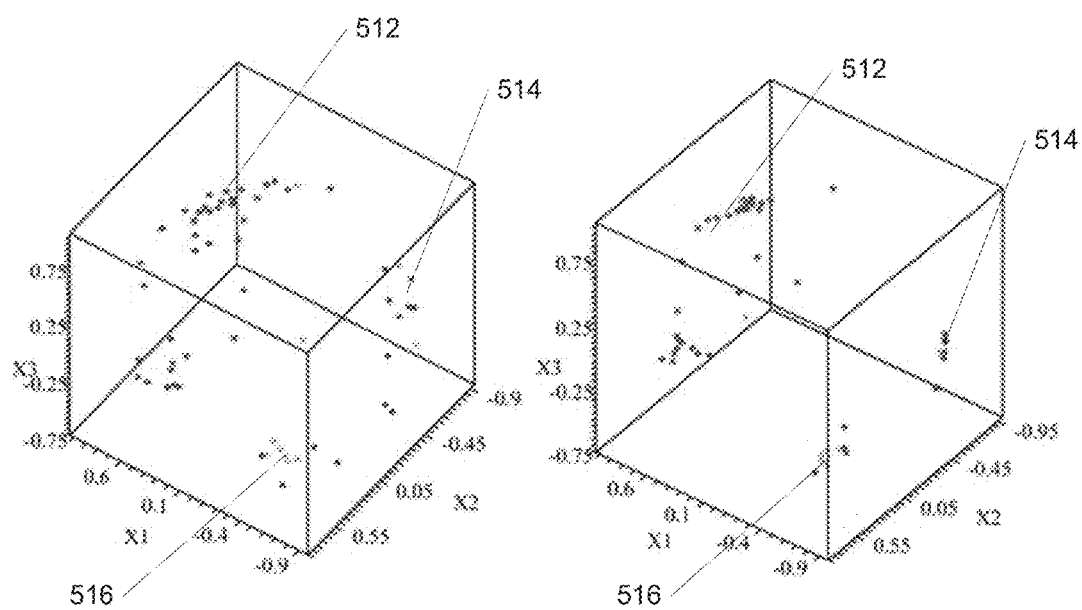
FIGS. 9A-C show initial (a), intermediate (b) and final (c) point positions relating to a combined DQC and SVD-entropy example.
Figure 9C:
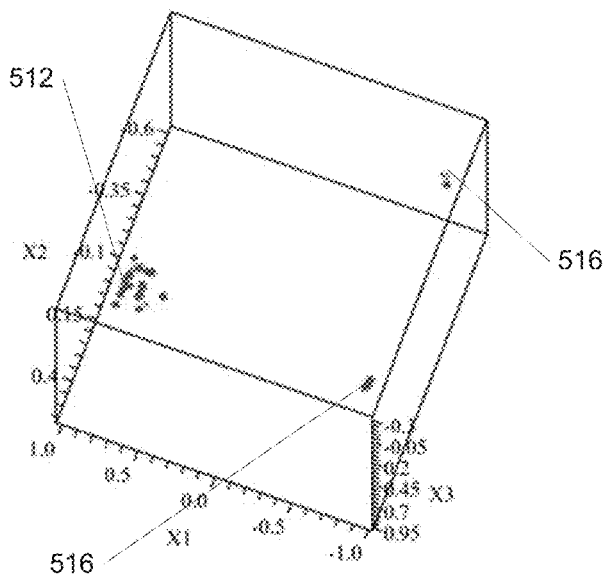

Finally, to complete our discussion, we show FIGS. 9A-C. These figures show the results of doing five iterations of the SVD-entropy based filtering and following that with three stages of DQC evolution. FIG. 9A is what the starting data looks like if one first removes the blue points and does five stages of SVD-entropy based filtering. FIG. 9B is what happens after one stage of DQC evolution. FIG. 9C is the final result after iterating the DQC evolution step two more times. At this point, the clusters are trivially extracted.

The dramatic clustering accomplished by DQC evolution makes it easy to extract clusters. Note however, that in FIG. 9B we see what we have seen throughout, that the red points 512 first form two distinct sub-clusters that only merge after two more stages of DQC evolution. This constant repetition of the same phenomenon, which is only made more apparent by SVD-entropy based filtering, is certainly a real feature of the data. It presumably says that what appears to be a sample of a single type of cell at the biological level is in reality two somewhat different types of cells when one looks at gene expression. A measure of the success of clustering is given by the Jaccard score which, for this result is 0.762, and is higher than the value 0.707 obtained by Varshaysky et al. in the above-cited article. The Jaccard score is evaluated by considering all pairs of data points, and asking if they cluster together and if they fit in the same class, as judged by the expert. The Jaccard score is then defined by $$J = \frac{tp}{tp + fp + fn},$$

where tp, fp, and fn, stand for true-positive, false-positive and false-negative, correspondingly.

Turning now to FIG. 13, a process for performing dynamic quantum clustering with filtering in accordance with an embodiment of the invention is shown. The process 1300 includes obtaining (1310) source data, assigning (1312) source data to a conceptual space, and constructing (1314) one or more potential functions. Positions over a time interval are calculated (1316) and data clusters are evaluated (1318). If the cluster threshold is reached (1320), data clusters can be labeled (1324). If the cluster threshold is not reached (1320), strongly clustered data is filtered (1322), positions over time intervals are calculated (1316), and data clusters are evaluated (1318). However, it should be noted that any processes not specifically described above, including those that omit one or more functions or utilize different techniques than those described above, can be utilized in accordance with the requirements of specific applications of embodiments of the invention. Additionally, any of a variety of filtering and/or aggregation techniques can be utilized to identify and isolate the strongly clustered data for filtering (1322) as appropriate to the requirements of specific applications of the invention.

Extending Dynamic Quantum Clustering

We have proposed a dynamical method for exploring proximity relationships among data points in large spaces. Starting with the potential function of quantum clustering we have shown how to embed it into a dynamical theory so as to provide a visual exploratory tool. Formulating the theoretical treatment using coherent (Gaussian) states allows us to derive analytic expressions for all necessary calculations of the temporal evolution. This allows us to treat quite complicated data and put them into a visual framework that can be easily manipulated by the user who wishes to search for structures in the data. We have tested the system on random data to make sure that it does not produce unwarranted clustering structures.

Throughout this text, we represent the DQC evolution of the Gaussians associated with the original data points, by following the centers of the evolving wave-functions. It should be noted that there is more information to be gained from the full wave-function of a data point: it is expected to expand, at times, and cover a large fraction of the domain of the cluster with which this point is associated. It may also tunnel into neighboring clusters with which the point has small dynamic distances. We expect this notion to be particularly useful when the data may be better described in terms of 'elongated clusters', i.e. when cluster cores are not points but lines (e.g. a ring) or higher-dimensional manifolds. Note that our methodology is not confined to potentials that have only well-separated minima.

We have discussed the virtues of combining DQC with some preprocessing tools. The first was SVD, which was used to limit the range of the data values and to allow us to do some dimensional reduction. While dimensional reduction is a must for handling data in very large dimensions, and it helps to remove noise from the data, we wish to point out that DQC can handle a large number of features without much difficulty. The computational complexity of the problem is controlled by the number of data points, since this defines the size of the matrix to be exponentiated. The computational cost associated with keeping more features is only related to computing the matrices associated with multiplying a wave-function by a given coordinate. This is a one-time cost. The computational cost of computing the values of these operators only grows linearly with the number of features. Clearly it is possible to avoid these costs by keeping a large number of features when constructing the quantum potential, $V(\vec{x})$, and plotting a much smaller number of features when constructing the animations. Experience has shown that after one stage of DQC evolution, clustering which occurs because of structures in $V(\vec{x})$ that are only seen in features that are not plotted in the animations becomes readily visible in those plots that we do construct. This aspect of DQC allows us to avoid some of the problems associated with using SVD to strongly reduce the number of dimensions. In addition to dimensional reduction based upon simply making an SVD decomposition of the data, we discussed one scheme for selecting individual features that are judged to be relevant to the data at hand. Since our problem is unsupervised, we employed a feature filtering method that depends on the contribution of the features to SVD-entropy. The examples showed that the visual nature of DQC made it easy to judge the effectiveness of feature filtering, especially after iterative applications of DQC evolution.

We have already noted, that for sets of data containing entries with a very large number of features, DQC has the computational advantage that once one has formed the Hamiltonian of the system, the computational problem is carried out using a matrix which has no more rows and columns than the number of data points. Moreover, we have seen that the simplest reduction of the analytic problem of assigning data points to minima of the multi-dimensional potential function works remarkably well. Going beyond the truncation procedure explained in Appendix B, while easily doable, seems unnecessary for most problems, and this allows us to greatly speed up the computations. In our analysis, we went on to discuss the case of data sets containing large numbers of points. It turns out that, using our Hilbert space representation of data points, we can naturally select a small set of points whose Gaussians span efficiently the entire Hilbert space. These Gaussians are then used as the basis for calculating the DQC evolvement of all points. It is apparent from the example displayed in FIGS. 4A-D how well these properties of DQC can be employed to discern structures in the large data-set under consideration.

Finally, we wish to observe that our DQC methods can be easily extended to general classification problems that are usually resolved by supervised machine learning methods. The point is that given a training set, i.e., a data set that has been fully resolved by DQC once the appropriate stages of dimensional reduction and feature filtering has been applied, then one can use this set to classify new data. There are two different ways one can accomplish this task. In the first approach we use the fact that the training set has been successfully clustered to assign distinct colors to points that lie in the training set, so that they may be visually identify in all subsequent studies. Once this has been done, the classification of new data points can be accomplished in two steps. First, reduce the SVD matrix containing both the training set and the new data points (using the previously determined features) to an appropriate dimension, and construct the QC potential for the full data set including the training set. Next, apply DQC to study the evolution of the full system using the new QC potential and see how the new points associate themselves with the points in the training set. Note, as always, both the intermediate dynamics and eventual coalescence of the full set into clusters can give useful information about the full data set. The fact that the old points have been colored according to the original classification scheme makes it possible to see if the SVD reduction of the full data set (training set plus new data) distorts the original classification. If this happens, i.e. if the original points fail to cluster properly, then one can go back and use the tools of feature filtering, etc. to analyze what has changed. This sort of visual identification of aspects of the data that distort clustering was already used in the case of the leukemia data set to see that the existence of a strong cluster can distort the clustering of the remaining data. Once this easily identified cluster was removed from the data set the clustering of the remaining data was significantly improved.

The second approach, which is necessary if the dataset contains many entries and the training set is itself large, is to use only the training set to generate the quantum potential and the exponential of the Hamiltonian. Next, as we already discussed, use this operator to evolve the full dataset, including the training set. In this case, the training set is guaranteed to cluster as before and we can categorize the new points according to how they associate with known clusters in the training data.

The preceding description has been by way of example as opposed to limitation, and many variations of the given examples can also be employed in practicing embodiments of the invention. For example, the quantum-mechanical Schrödinger formalism (i.e., time-dependent states, time-independent operators) has been employed to calculate expected positions. The above development can also be equivalently expressed in the Heisenberg formalism (time-dependent operators, time-independent states), since it is well known in the art that calculated results (i.e., expected positions) do not depend on which of these formalisms is employed.

As another example, it is possible to generalize the quantum mechanical time evolution by including a small diffusion component, so that time evolution is governed by $$\frac{i}{1-i\varepsilon}\frac{\partial \psi_i(\vec{x}, t)}{\partial t} = \hat{H}\psi_i(\vec{x}, t), \quad (19)$$

where e is the diffusion parameter. In this approach, it is necessary to modify the expectation calculations to properly account for non-unitary time evolution.

APPENDIX A. USEFUL OPERATOR IDENTITIES

Using conventional quantum-mechanical notation we represent the Gaussian wave-function by $$|\sigma\rangle = \left(\sqrt{\pi}\,\sigma\right)^{-\frac{1}{2}} e^{-x^2/2\sigma^2} \quad (20)$$

where we adopted Dirac's bra and ket notation to denote $|\psi\rangle = \psi(x)$ and $\langle\psi| = \psi(x)^*$.

Employing the operators x and $$p = \frac{1}{i}\frac{d}{dx}$$

obeying the commutation relations [x, p]=i, we define the annihilation operator $$A_\sigma = i\frac{\sigma}{\sqrt{2}}p + \frac{1}{\sigma\sqrt{2}}x \quad (21)$$

obeying $$A_\sigma|\sigma\rangle = 0.$$

its Hermitian adjoint creation operator can be $$A_\sigma^\dagger = -i\frac{\sigma}{\sqrt{2}}p + \frac{1}{\sigma\sqrt{2}}x \text{ obeys } [A_\sigma, A_\sigma^\dagger] = 1.$$

We will need a few identities to derive the matrix elements we have to calculate. First we note the normal ordering identity (meaning rewriting by using the operator commutation relations so that $A_\sigma$'s appear to the right of all $A_\sigma^\dagger$'s):

$$e^{\alpha(A_\sigma^\dagger + A_\sigma)} = e^{\alpha^2/2} e^{\alpha A_\sigma^\dagger} e^{\alpha A_\sigma} \quad (22)$$

which may be proven by differentiation with respect to a. Next we note that $$e^{g(\alpha)A_\sigma^\dagger} A_\sigma e^{-g(\alpha)A_\sigma^\dagger} = \quad (23)$$
$$\sum_n \frac{g(\alpha)^n}{n!} [A_\sigma^\dagger, [A_\sigma^\dagger, [\cdots, [A_\sigma^\dagger, A_\sigma]]]\cdots]_n = A_\sigma - g(\alpha)$$

which is easily derived by differentiating with respect to g and noting that only the first commutator is non-zero. A similar calculation proves the equally useful result:

$$e^{\alpha(A_\sigma^\dagger - A_\sigma)} = e^{\alpha^2/2} e^{\alpha A_\sigma^\dagger} e^{-\alpha A_\sigma} \quad (24)$$

Now, because the Parzen window estimator is constructed using Gaussian wave-functions centered about points other than x=0, it is convenient to have an operator expression which relates the Gaussian centered about x=0 to the Gaussian centered about x=$\bar{x}$.

Theorem:

$$|\sigma,\bar{x}\rangle = e^{-ip\bar{x}}|\sigma\rangle$$

is a normalized Gaussian wave-function centered at x=$\bar{x}$; i.e.

$$|\sigma, x\rangle = \left(\sqrt{\pi}\,\sigma\right)^{-\frac{1}{2}} e^{-(x-\bar{x})^2/2\sigma^2} \quad (25)$$

This state is known as a coherent state, obeying $$A_\sigma|\sigma,\bar{x}\rangle = \bar{x}|\sigma,\bar{x}\rangle \quad (26)$$

The generalization to Gaussians in any number of dimensions is straightforward, since they are just products of Gaussians defined in each one of the different dimensions.

APPENDIX B. MATRIX ELEMENTS

The states we start out with $|\sigma,\bar{x}_i\rangle$ have norm one and are, in general, linearly independent; however, they are not orthogonal to one another. In what follows we will need an explicit formula for the scalar product of any such Gaussian $|\sigma,\bar{x}_i\rangle$ with another $|\sigma,\bar{x}_j\rangle$. This is easily derived given the operator form for the shifted Gaussian derived in Appendix A. Thus we find that $$\langle \sigma, \bar{y} \mid \sigma, \bar{x}\rangle = \langle \sigma|e^{-ip(\bar{x}-\bar{y})}|\sigma\rangle = e^{-(\bar{x}-\bar{y})^2/4\sigma^2} \quad (27)$$

which is needed for computing the matrix of scalar products $$N_{i,j} = \langle \sigma,\bar{x}_i|\sigma,\bar{x}_j\rangle.$$

Similarly, by employing $$e^{ip\bar{y}}xe^{-ip\bar{y}} = x+\bar{y}$$

we find that $$\langle \sigma, \bar{y}|x|\sigma, \bar{x}\rangle = \frac{(\bar{x}+\bar{y})}{2}e^{-(\bar{x}-\bar{y})^2/4\sigma^2} \quad (28)$$

It is straightforward to generalize this derivation to obtain $$\langle \sigma, \bar{y}|V(x)|\sigma, \bar{x}\rangle = e^{-(\bar{x}-\bar{y})^2/4\sigma^2}\left\langle \sigma\left|V\left(x+\frac{\bar{x}+\bar{y}}{2}\right)\right|\sigma\right\rangle \quad (29)$$

for any function V(x). Note that this expectation value can be evaluated by expanding V in a Taylor series about the point $(\bar{x}+\bar{y})/2$. The leading term is simply $$e^{-(\bar{x}-\bar{y})^2/4\sigma^2}V\left(\frac{\bar{x}+\bar{y}}{2}\right)$$

and the remaining terms, involving $\langle \sigma|x^n|\sigma\rangle$ can be evaluated from the identity $$\langle \sigma|e^{\alpha x}|\sigma\rangle = \sum_{n=0}^{\infty}\frac{\alpha^n}{n!}\langle \sigma|x^n|\sigma\rangle = \sum_{p=0}^{\infty}\frac{\alpha^{2p}}{4^p}\frac{\sigma^{2p}}{p!} \quad (30)$$

To speed up computations we chose to approximate all expectation values of V(x) by $$V\left(\frac{\bar{x}+\bar{y}}{2}\right),$$

the first term in this series. A more accurate approximation to the original problem can be obtained by including additional terms but explicit computation has shown that, for our purposes, this level of accuracy is sufficient.

The final formula we need to derive is that for $$\langle \sigma, \bar{y}|p^2|\sigma, \bar{x}\rangle = \langle \sigma|p^2 e^{-ip(\bar{x}-\bar{y})}|\sigma\rangle = \frac{(\bar{x}-\bar{y})^2}{2\sigma^2}e^{-(\bar{x}-\bar{y})^2/4\sigma^2} \quad (31)$$

With these preliminaries behind us, it only remains to describe the mechanics of the DQC evolution process, where we evaluate the Hamiltonian truncated to an n×n matrix in the non-orthonormal basis of shifted Gaussians:

$$H_{i,j} = \langle \sigma,\bar{x}_i|\hat{H}|\sigma,\bar{x}_j\rangle \quad (32)$$

The time evolution of our original states is computed by applying the exponential of the truncated Hamiltonian to the state in question; i.e.

$$|\sigma,\bar{x}\rangle(t) = e^{-iHt}|\sigma,\bar{x}\rangle.$$

Computing the exponential of the truncated operator is quite simple, except for one subtlety: we have defined H by its matrix elements between a non-orthonormal set of states. Hence, to perform the exponentiation, we first find the eigenvectors and eigenvalues of the metric $N_{ij}$ and use them to compute the matrix $N_{i,j}^{-1/2}$. If our original set of states is not linearly independent, then $N_{i,j}$ will have some zero eigenvalues. Clearly, we throw their corresponding eigenvectors away when computing $N_{i,j}^{-1/2}$. In practice we discard all vectors whose eigenvalue is smaller than a predetermined threshold (e.g., $10^{-5}$) selected to balance numerical efficiency and accuracy.

Then we construct the transformed $$H_{i,j}^{tr} = \sum_{k,j}N_{i,k}^{-1/2}H_{k,j}N_{l,j}^{-1/2} \quad (33)$$

Now we can construct the exponential of this operator by simply finding its eigenvectors and eigenvalues. In order to compute the time evolution of one of the original states we simply write them in terms of the orthonormal basis.

The only step which remains is to explain how we compute the expectation values of the operator x as functions of time: we first construct, for each component, the operator $$X_{i,j} = \langle \sigma,\bar{x}_i|x|\sigma\bar{x}_j\rangle \quad (34)$$

and use $N_{i,j}^{-1/2}$ to put this into the same basis in which we exponentiate H; i.e., construct $$X_{i,j} = \sum_{k,l}N_{i,k}^{-1/2}X_{k,j}N_{l,j}^{-1/2}. \quad (35)$$

Dynamic Quantum Clustering Revisited

The worlds of science, engineering, and business are full of optimization problems. These are problems where one has to choose optimum values for control parameters in order to maximize some desired behavior. The quantum evolution technology developed to implement DQC can be used to tackle these difficult problems in a novel way. By replacing the quantum potential with the function that needs to be optimized and selecting the parameter range that one wishes to study, all one has to do is lay down a grid of points, i.e. define a set of Gaussian functions centered on this grid of points, select a template basis and then use DQC evolution to move these points towards the nearest local minimum. This will result in clusters that lie near all of the local minima in the region. This method converges faster and is more stable than gradient descent (Newton-Raphson) and the intermediate stages of the quantum evolution give a picture of the topological structure of the function in many dimensions that one does not get from Monte Carlo computations. This technology has applications to problems that have to do with scheduling, optimizing business strategy, improving engineering designs, etc.

As described above, a DQC analysis begins with source data that can be presented as an m×n data matrix. In many embodiments, the source data is transformed using any of a variety of techniques to be represented as a data matrix.

Each data point is one of the m rows of the matrix and is defined by the n-numbers that appear in that row. These n numbers are referred to as features and the set of all possible sets of n-values that might appear in a row is referred to as the feature space. The process of creating a clustering algorithm includes the creation of a potential function that serves as a proxy for the density of data points. In many embodiments, a function is defined on the n-dimensional feature space of the source data (i.e. a Parzen estimator). In several embodiments, the function is constructed as a sum of Gaussian functions centered at each data point. That is, for m data points, $\vec{x}_i$, the following function $$\varphi(\vec{x}) = \sum_{i=1}^{m} e^{-\frac{1}{2\sigma^2}(\vec{x}-\vec{x}_i)(\vec{x}-\vec{x}_i)}$$

is defined. A potential function $V(\vec{x})$ is defined over the same n-dimensional space. In a variety of embodiments, $V(\vec{x})$ is a function that satisfies the time-independent Schrödinger equation for $\varphi(\vec{x})$ $$-\frac{1}{2\sigma^2}\nabla^2\left|\varphi + V(\vec{x})\varphi = E\varphi = 0\right.$$

It should be noted, however, that the value zero is chosen to simplify the mathematics and plays no important role. The energy can always be set to zero by adding a constant to the potential.

Using the Hamiltonian defined by this potential, each Gaussian that is associated with a specific data point is evolved by multiplying it by the quantum time-evolution operator $e^{-i\delta tH}$. In a variety of embodiments, this operator is constructed in a subspace spanned by the Gaussians corresponding to the original data points. The data points are evolved by computing the new location of the center of each evolved Gaussian. This evolution can be performed iteratively over multiple time steps and the evolution of the data points can be measured at the time steps. The output DQC evolution is representation (e.g. an animation) showing how data points move towards the nearest minimum of the potential. If the potential has isolated minima due to topologically simple regions of higher density, then the results of the evolution are fixed points describing isolated clusters. If, however, there are higher density regions of the data where the density is constant along complicated and possibly intersecting shapes, then the results of DQC evolution will be filamentary structures. In several embodiments, filamentary structures are generated if there are subsets of the data that exhibit multivariate correlations that can be parameterized in terms of only a few variables.

Example: Sloan Digital Sky Survey (SDSS) Data

To demonstrate that the DQC potential accurately captures the density of data points and that DQC evolution can reveal extended, topologically non-trivial structures (or regions of nearly constant density) hidden in the data, DQC is applied to a well understood subset of 139,798 galaxies taken from the Sloan Digital Sky Survey (SDSS). Each data entry consists of the three coordinates of a single galaxy. The first two numbers are θ and φ, the angular coordinates defined in our Galaxy; the third coordinate is the redshift, z, a proxy for the distance from us to the other galaxies. It is well known that galaxies are not uniformly distributed, but rather they form a web of filaments and voids, so the question is if DQC evolution will reveal this structure.

Figure 12A:
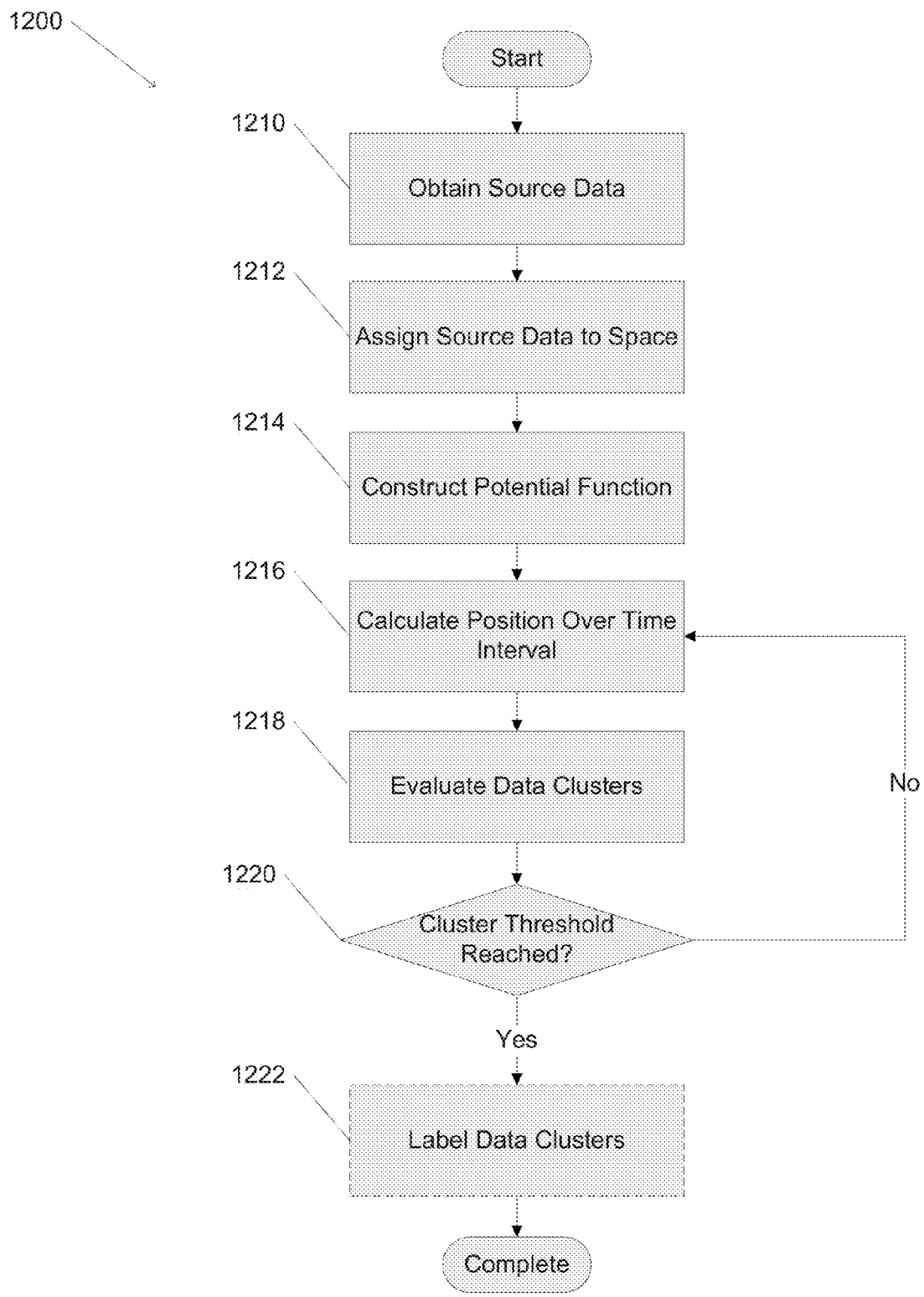
FIG. 12A is a flow chart illustrating a process for dynamic quantum clustering in accordance with an embodiment of the invention.
Figure 12C:
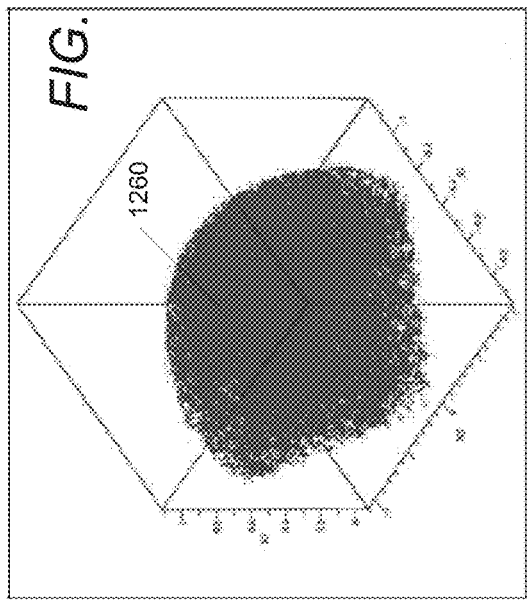
FIGS. 12B-E are conceptual illustrations of the evolution of a set of data points during iterations of a dynamic quantum clustering processes in accordance with embodiments of the invention.
Figure 12E:
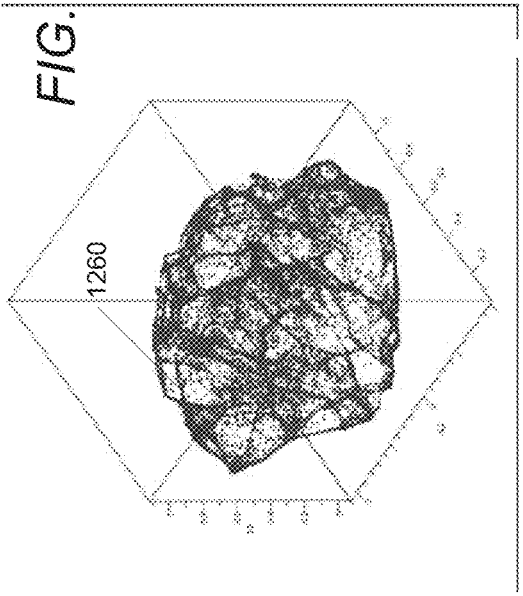
Figure 12B:
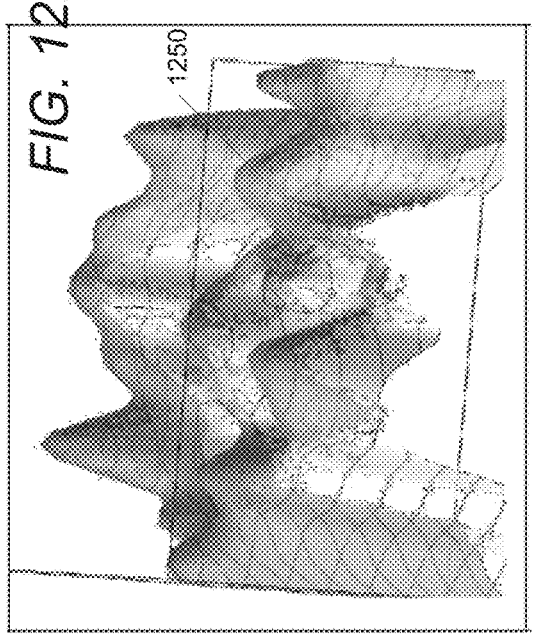
Figure 12D:
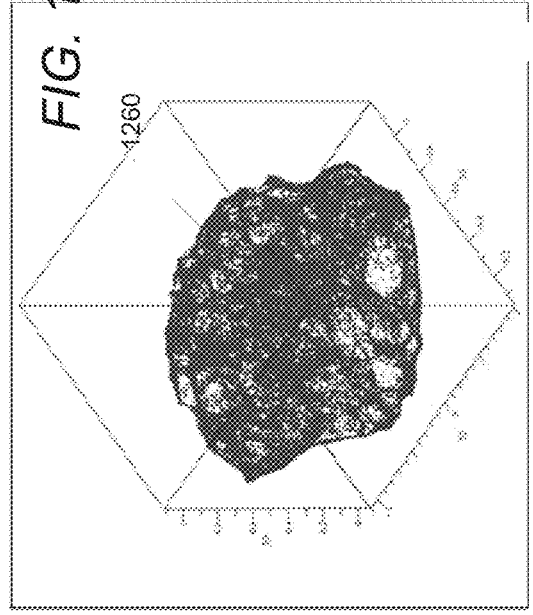

Turning now to FIGS. 12B-E, a visual representation of a DQC evolution is shown. FIG. 12B conceptually illustrates a comparison of the SDSS data points with the derived DQC potential. The potential is plotted upside down, and the yellow data points 1250 are slightly shifted in order to increase their visibility. Turning now to FIG. 12C, the distribution of the data 1260 in a 3D space defined by θ, φ, and z is shown. Turning now to FIG. 12D, an early state of DQC evolution of the data 1260 is shown. Turning now to FIG. 12E, a later evolution of the data 1260 is shown. As can be seen in the evolution from FIG. 12D to FIG. 12E, string-like structures clearly appear over successive iterations of the DQC evolution. In this case, the DQC evolution reveals the existence of the network of filaments and voids that is not readily apparent in FIG. 12C. The web of filaments revealed in this picture correspond to the topological structure of the minima of the quantum potential.

Example: LCLS Pump-Probe Data

A set of source data from the pump-probe facility at the SLAC Linear Coherent Light Source (LCLS) provides the basis for this example of how DQC can be used to drill down and extract the content of a large noisy dataset. In this experiment, a germanium sample is pumped—by hitting it with an infrared laser pulse—and then probed—by hitting it with an x-ray pulse from the LCLS. The purpose of the infrared laser is to set the crystal into oscillation; the purpose of the x-ray beam is to take a snapshot of the crystal at a specified time after the infra-red laser pulse has been applied. Repeating this process a large number of times with different time delays between the laser and x-ray pulses produces a movie (i.e. a set of representations) of the pattern of crystal oscillations. In this case, it turns out that the challenge is to identify the 2.37% of the data that contains a useful signal. The DQC analysis demonstrates how to deal with data when DQC evolution results in an unusually large number of clusters that vary widely in size. Additionally, the final analysis shows that both the good and the noisy data end up being useful. The good data sheds light on the physics of the sample, while the noisy data ends up mapping the locations of possible defects in the detector. The good data (i.e. the desired data to be analyzed) includes the pixels that carry the information about the phonon spectrum of the sample. However, since the beam parameters vary during the experiment most of the data is very noisy. Hence, it is first necessary to isolate the small amount of good signal and then to show that the existence of sets of correlated pixels—with the same time dependence—implies that one is seeing coherent effects due to the laser pulse.

Figure 13A:
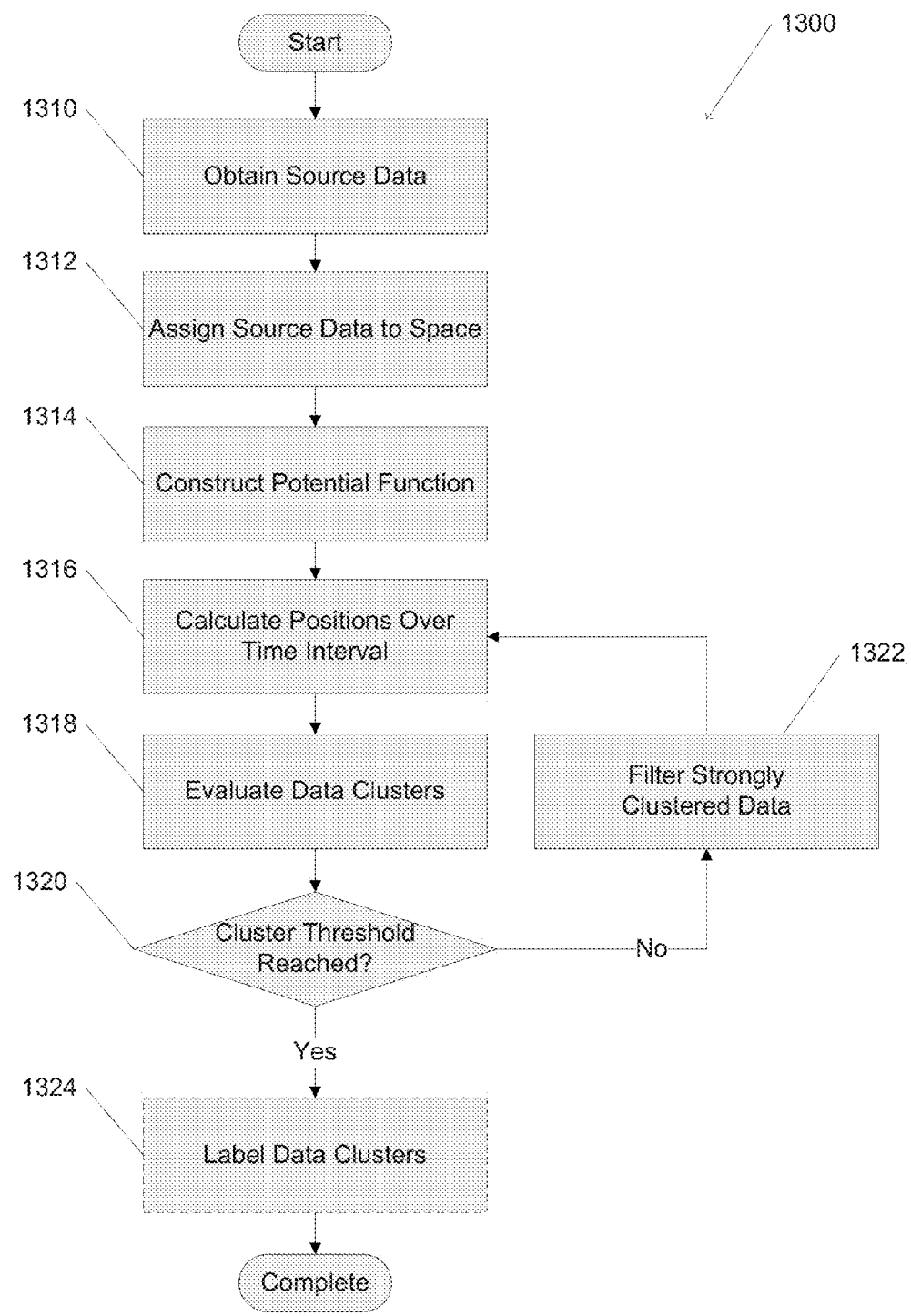
FIG. 13A is a flow chart illustrating a process for filtering clusters during dynamic quantum clustering in accordance with an embodiment of the invention.
Figure 13C:
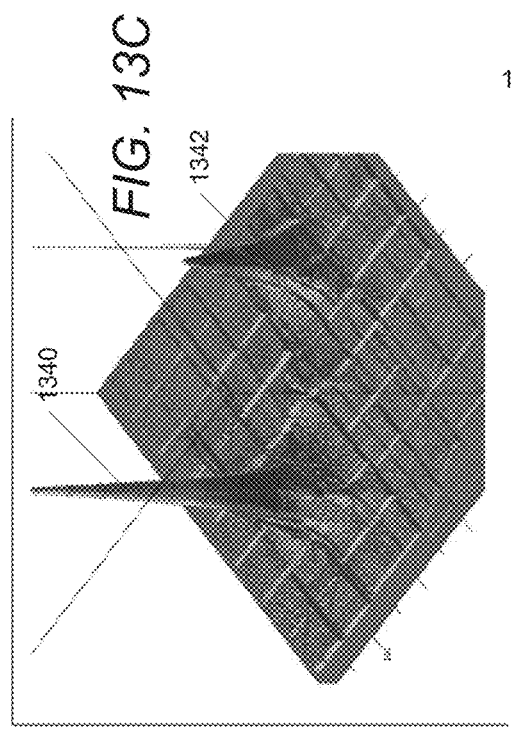
FIG. 13C is a conceptual illustration of a SVD eigenvector of a data signal in accordance with an embodiment of the invention.
Figure 13E:
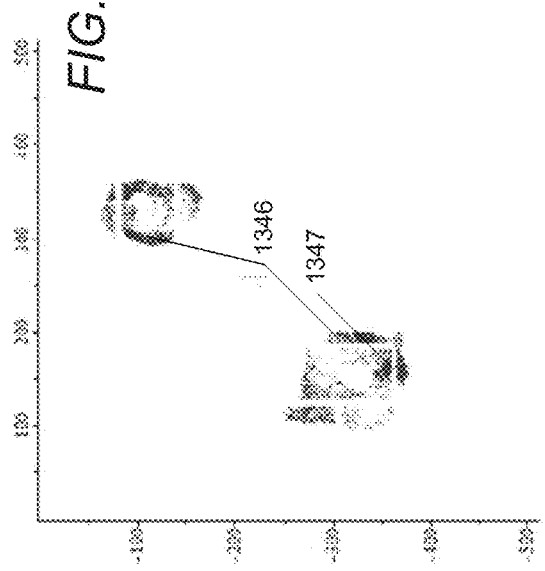
FIGS. 13D and 13E are conceptual illustrations of generated representations of a dynamic quantum clustering evolution of a data signal based on the eigenvector of a data signal in accordance with an embodiment of the invention.
Figure 13B:
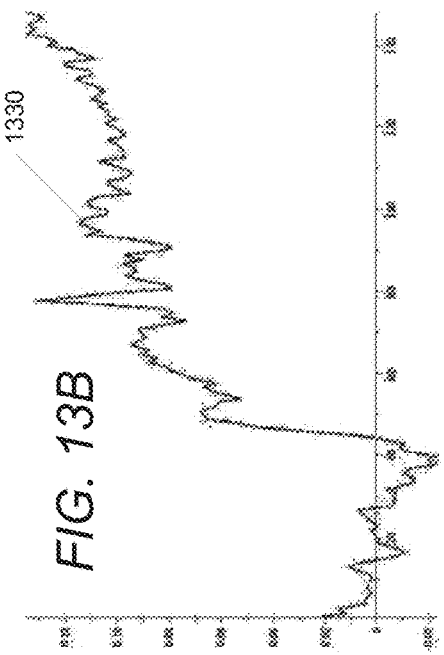
FIG. 13B is a conceptual illustration of an average data signal in accordance with an embodiment of the invention.

The source data is presented as a 262144×144 dimensional matrix. Each row records the time dependence of a single pixel in a 512×512 image of the germanium crystal. The first 40 entries in a row represent the time dependence of the scattered x-ray beam before the application of the infra-red pulse. Thus, each column of the data matrix is a picture of the scattered beam at a specific point in time. To process the data we begin by removing rows where all of the entries are zero. This leaves a 204945×144 data matrix, which we rewrite—using an SVD decomposition—as $M_{data} = U\,S\,V^{tr}$. Turning now to FIG. 13B, a conceptual illustration of a row of $V^{tr}$ is shown. The rows of $V^{tr}$ define 144 orthonormal time-dependent curves that—when added together—reconstruct the full data matrix. While the average signal 1330 shown in FIG. 13B shows no simple periodic behavior, to better understand why the average shows no sign of this behavior we turn to the plot shown in FIG. 13C. By focusing on a single column of U that tells us how much the corresponding row of $V^{tr}$ appears in the source data matrix, a graphical representation can be constructed of the crystal as seen by each of the SVD eigenvectors. FIG. 13C shows a plot corresponding to the time dependent curve 1330 shown in FIG. 13B. The plot shown in FIG. 13C exhibits two strong peaks 1340 and 1342 (this signal comes from diffuse scattering from the tails of the Bragg peaks) and then a patterned small amplitude signal. If the crystal is not excited by the laser then the x-ray beam should scatter from the crystal at Bragg angles (or—in reality—almost Bragg angles). Due to the excitation of phonons by the infra-red laser, these peaks are broadened to produce the structures shown in FIG. 13C.

The patterned small amplitude signal outside of the peaks in FIG. 13C is produced mainly by electronic noise in the detector and as such provides an image of the detector. Since over 95% of the data is this detector noise, it is reasonable that the average of the data will not show the periodic variation that one should see from data concentrated in the peaks. Actually, due to the poor quality of much of the data in the peak regions, a much smaller fraction of the data will show a clear difference between data taken at times before the infra-red pulse is applied and times following the infra-red pulse. While plotting the first few SVD components strongly suggests that we should focus on the data points that lie in the Bragg peaks, a DQC evolution was performed for all of the data in order to see if it contained any surprises. The data corresponding to the two broadened Bragg peaks amounts to ~15,000 data points that are filtered from the source data to be analyzed in more detail.

The DQC analysis of the filtered dataset begins with a new SVD decomposition of the data. Examination of the first SVD component, the component that represents the average of the time dependent data, reveals that it still looks like the average of the background data. Moreover, the second and third SVD components also seem to coincide with the second and third SVD eigenvectors for the full dataset. As the real interest is in the variation of the data about the average behavior, a filtered representation of the data is constructed by eliminating the contributions of the first three SVD components. Initially—since there are only ~15,000 points in this filtered data—DQC evolution of the filtered data was performed in both 21 and 9 dimensions. These dimensions were initially chosen arbitrarily, however except for small variations, the results of both analyses agreed. Since working in 9-SVD dimensions takes less computer time, it is desirable to identify data sets where the analysis can be performed in lower dimensions in order to decrease the resources (both memory and processing power) utilized to perform the DQC analysis. In this way, the use of SVD decomposition (or any other data sampling and/or aggregation technique) can be employed to improve the performance of DQC processes without substantially impacting the reliability of the generated representations.

Figure 13D:
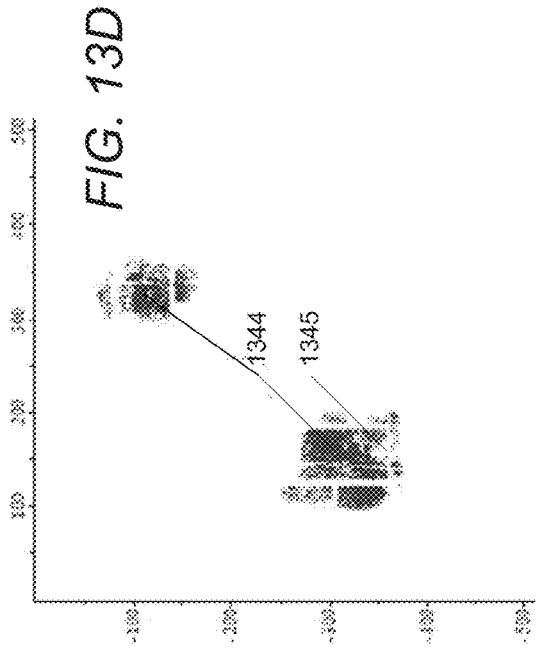

DQC evolution of the filtered pump-probe data results in a total of 669 point-like clusters that vary in size from clusters containing a single data point (these include slightly less than 10% of the data), to clusters containing tens of points and even a few clusters containing 500-1552 data points. Since the infra-red pulse is always applied at $t=40$ the signal seen in any spectrum for $t<40$ corresponds to noise. The data is divided into two types: good spectra that exhibit strong signals for times $t>40$ and a smaller noisy signal for $t<40$ and noisy spectra where there is no appreciable difference between the amplitude of the signal for $t<40$ and $t>40$. Clusters including data points taken from the "good" spectra and the noisy data. Close agreement between the raw data and the SVD reconstruction of the data indicates why DQC evolution in both 21 and 9 dimensions give the same results Investigating single spectra suggests a simple way to separate good data clusters from bad data clusters: namely, average the spectra in each of the 669 clusters and then—for each average—require that the mean value of the signal for $t<40$ to be less than half of the average value for $t\geq40$. This procedure separates the 669 clusters into 367 clusters containing good data and 302 clusters containing noisy data. This leads to a total of 6172 spectra that correspond to good data, which is to be compared to the 12145 spectra associated with locations in the two peaks. Thus, we see that in the end only 2.37% of the original dataset contains good data. This separation into good and noisy data will allow us to show that the oscillations seen in the good data exhibit correlations between phonons in disjoint regions of the broadened Bragg peaks. This kind of correlation implies that good data captures the coherent excitation of the germanium lattice by the infra-red laser and thus, they can be used to study the phonon spectrum. Before demonstrating this result, it is worth demonstrating that the noisy data also has something to tell us about the detector and the quality of the cut we made to isolate the diffuse Bragg peaks. By comparing plots of the good and noisy data when both are plotted on the two-dimensional plane of the pixel-detector we made a serendipitous discovery. Turning now to FIG. 13D, a plot showing the filtered data at the location of every pixel associated with a good signal 1344 is shown. Turning now to FIG. 13E, a similar plot is shown with pixels containing noisy data 1346. As is evident from these two plots, the good 1344 and the noisy data 1346 are intermixed to a certain degree. In other words, the noisy data come from detector pixels that are adjacent to and between pixels that contain good data. Presumably, this means that not all of the pixels on the detector are working well. This assumption is buttressed by the fact that FIG. 13D shows a small circular region 1345—at the bottom of the region corresponding to the main broadened Bragg peak—that contains no good data. Moreover, FIG. 13E has a solid circle of noisy data 1347 in the same region. This leads us to conclude that this circular region represents localized damage to the detector. The strongest signal that appears in the good data corresponds to locations where there is an absence of signal in the noisy data. Regions where the x-ray scattering signal is far above the detector noise should produce pixels with the cleanest signals and it does. In the peripheral region, where the x-ray scattering signal drops towards the amplitude of the detector noise, we expect to find the noisier pixels. The separation of good data from noisy data by extracting the clusters produced by DQC evolution and averaging the signals in each cluster to reduce stochastic noise, allows us to create a simple criterion for separating good from noisy data that does a much better job of preserving the useful signal.

The main result is that data obtained using this pump-probe technique can be used to study coherent lattice vibrations and thus the non-equilibrium phonon structure of the crystal. This was accomplished despite the noisy nature of the data, problems with the detector, and problems introduced by the difficulty in stabilizing the properties of the x-ray beam. Furthermore, the fact that DQC allows us to establish correlations between pixels by looking at data in the time domain—rather than in the Fourier domain—opens up the possibility of recovering more detailed information about the nonequilibrium dynamics in the crystal. This result means that it should be possible to carry out this sort of study on crystals whose phonon band structure is not well understood. We also found that by separating good and noisy signal using DQC we could identify regions where the pixel detector failed to work properly. From the data mining perspective, we see that once again DQC successfully clustered complex, noisy signals by their structure in feature space. In this case, we extracted from data coming from pulse probe experiments the 2.37% of the signals that contain useful information. A new feature of this analysis is that the final number of clusters—669 in all—is quite large and the final clusters vary enormously in size. This is not what one might have expected going in to the analysis. Since there is no way to guess how many significantly different spectra would be visible in the data, it was important that DQC—unlike many other methods—does not need to make any a priori assumptions about the number of clusters that may exist. Another important observation is that by performing the initial analysis in both 9 and 21 dimensions, we found that the two analyses agree with each other, thus we concluded that it was safe to work in the lower number of dimensions. This is easy to do because the time required for a DQC analysis only grows linearly with the increase in dimension.

Feature Selection

As describe above, DQC analysis can begin with the generation of a visual representation wherein proxies of the data points (i.e. the source data) move from their initial position towards the nearest region of higher density over a time period. This step can be referred to as the DQC evolution of the data. Correlated subsets can be distinguished from one another depending on their final shape during or after DQC evolution. In a variety of embodiments, extended shapes are referred to as structures and/or the term cluster is reserved for subsets that collapse to a point. This visual representation reveals how and why the algorithm identifies and distinguishes between structures and clusters. Any of a variety of visual representations, including image data, audio data, video data, text data, and any other representation can be utilized as appropriate to the requirements of specific applications of the invention. Because DQC is data-agnostic, that is it does not have to use domain specific knowledge to partition the data—it can be usefully applied to any set of data. Because DQC does not begin by assuming there are structures to be found, and because it has been proven not to find structures in random data and it makes no assumptions about the type or shape (topology) of structures that might be hidden in the data, it can be used to determine if the right kind of information is being collected. In contrast to methods that partition data based upon discernible separations, such as the support vector machine technique, DQC exploits variations in the density of the data. Thus, it reveals structures with unusual topologies even in very dense datasets. Furthermore, DQC works well for high-dimensional data since the time spent in a DQC analysis only grows linearly with the dimension of the data. Finally, while DQC's greatest strength is that it allows one to visually explore high-dimensional complex data for unexpected structure, it can also be used to rapidly classify incoming data once a sufficiently large subset of data has been analyzed. In this way, it can be used much in the same way as a neural net or tuned decision-tree. The quantum mechanical underpinnings of the DQC algorithm make it possible to deal with highly distributed data in parallel fashion in order to scale to very large problems.

In many embodiments, dynamic quantum clustering processes include constructing a quantum potential that provides a proxy for the density of the data in multi-dimensional feature space. It then uses quantum evolution to efficiently move a proxy for each datum to the nearest local minimum of this potential. In many embodiments, this is done over one or more time periods. At the end of the evolution, data point proxies (i.e. data points) that collect at a single, well-defined local minimum of the potential are called a cluster; data points that collect along an extended valley in the potential (created by a region of nearly constant density in the data) are called a structure. The most important result that emerges from most of these analyses is that many datasets reveal such topologically non-trivial structures that encode hidden information.

The visual nature of DQC makes it very easy to use it to solve a variety of data mining problems, such as feature selection. Suppose it is known how to classify data entries in terms of important attribute(s), but how or if the information about this particular item relates to this attribute is unknown. For example, the biological activity of a given protein is known, however the only information about the protein is its linear amino acid sequence. The question is, "does this linear sequence—devoid of knowledge about the three dimensional structure of the protein—contain enough information to predict its biological activity?" Furthermore, can unimportant information be eliminated and focus placed on only those locations that play an important role in the classification? There are many problems in finance, business, medicine, homeland security, etc. that fall into this category. In several embodiments, DQC processes can be utilized in order to perform feature selection for a set of data. For example, a SVD decomposition can be performed on the set of data and then labels (e.g. colors) assigned to the data points according to the classification that is known from external information. In a number of embodiments, the data matrix can be written as M=USVt. DQC evolution can then be carried to see if the points of a particular label predominantly associate with one another or if they fail to cluster at all. If the data points fail to exhibit any correlations plotted in this feature space, the qualities needed to be measured to predict the desired property are not being analyzed. This information can then be utilized to pick a different set of features to re-start the DQC analysis of the source data. If loose clusters and/or extended structures are formed, then it is likely the information is present. To further analyze these features, some or all of the source data can be plotted in each of the SVD dimensions. In a variety of embodiments, successive three dimensional plots is utilized to generate representations of these features. The extended structures can be examined to see in which SVD dimensions the new clusters or structures are best separated and/or have the largest extent. The corresponding rows of the matrix Vt (in the SVD decomposition) are examined to see which feature locations contain the largest values. The data matrix Vt can then be updated to include these features. The DQC clustering can then be refined to see if it produces better separation of the data according to the desired classification. If so, these features define the information that is important to the classification. This can be repeated to further refine the identification of important features. If the clustering degrades, such repetition has gone too far.

Example: Protein Function Data Set

Certain cells exchange water with their environment faster than can be accounted for by diffusion of water molecules through the cell wall. The explanation of this phenomenon is that the cell membrane contains pores that allow water and other molecules to move in and out of the cell body. These channels are created by proteins called aquaporins. Genetic defects involving aquaporins have been associated with serious human diseases. Understanding how and why aquaporins selectively transmit either water or glycerol molecules could thus lead to technologies for alleviating these medical conditions. Crystallizing a protein in order to obtain its 3-dimensional structure is the usual first step in figuring out which locations along the chain of amino-acids making up the protein determine its biological function. Unfortunately, most proteins are hard or impossible to crystallize. It would be a huge advance if identifying important locations along the protein's amino-acid chain could be done without using this 3-dimensional information. Conventionally, techniques such as a Multi-Sequence Alignment (MSA) matrix, assembled by using similar proteins performing the same functions in different species are utilized to facilitate this analysis. We show that, given such data, DQC can be used to find which locations on the protein are responsible for its classification into a water or glycerol transmitter.

The data consists of 529 aligned amino-acid sequences for two different kinds of aquaporins. The functional difference between these proteins is that one creates a channel that passes water molecules, and the other creates a channel that passes glycerol molecules. Each row in the data-matrix specifies the amino-acid sequence for a particular protein. Hence, since there are 20 amino acids, each row of the data matrix is given as a string of letters: i.e., A, C, D, E, F, G, H, I, K, L, M, N, P, Q, R, S, T, V, W, Y. We convert these letters to numbers from 1 to 20, so a single row contains 192 integers. Since some locations correspond to gaps in the aligned protein sequences and we arbitrarily assign the non-integer value 10.5 to those locations. The choice of this arbitrary number is unimportant and does not affect the following analysis. The analysis begins with an SVD decomposition of the data matrix and its dimensional reduction to the first three principal components. The first step in the analysis is to determine whether the data contains the information needed to distinguish a water aquaporin from a glycerol aquaporin. FIG. 14B shows the original data (U-matrix) plotted in SVD dimensions 2-3 where the extended structure is most apparent. Points are colored (red 1430, green 1432) according to the identification of the protein as either a water or a glycerol aquaporin. This plot is quite diffuse, but the separation of the red 1430 and green 1432 points suggests that separating the two types of aquaporins should be possible. FIG. 14C shows the result of applying DQC evolution to the data. The plot shows an extended v-like structure containing three distinct parts where two contain mostly red 1430 or mostly green 1432 points. This structure shows that the information needed to distinguish the proteins is present in the data.

However, the extended structure suggests that the data is very noisy. The challenge is to refine this separation and identify which of the 192 locations ($V^{tr}$-matrix data) are most important to this classification. Since the extended structure is most apparent in SVD dimensions 2 and 3, we turn our attention to the SVD $V^{tr}$-eigenvectors corresponding to these two values. Since the entries along the rows of $V^{tr}$ correspond to the different locations along the protein's sequence, the idea is that we can find the locations that are most relevant to the classification, by selecting from rows 2 and 3 of $V^{tr}$ the locations that contain the largest numerical values. By plotting the numerical values appearing in row 2 and row 3 of $V^{tr}$, we find that in each row the numbers naturally separate into three parts. Selecting those locations containing the largest values we obtain a list of 30 locations to be used to continue with the analysis. Using DQC, it is a simple matter to check that this approach makes sense. FIGS. 14D and 14E show the result of removing the unimportant features (162 locations along the sequences) from the dataset and re-plotting the data. Before DQC evolution, the restricted data is still diffuse. While it appears to exhibit better separation between the glycerol and water aquaporins (red 1440 and green 1442 points) it is hard to be sure that removing the so-called unimportant features made a significant difference as shown in FIG. 14D. However, the story is very different after DQC evolution. After evolution, the data is seen to cleanly divide into two compact clusters as shown in FIG. 14E, each of which is almost entirely red 1440 or green 1442. The small number of apparently incorrectly classified proteins is consistent with the known probability of errors in the data. These plots show that the features deemed unimportant—and thus removed from the data—play little or no role in distinguishing "water" and "glycerol" aquaporins. Given such a small number of interesting features, it is a simple matter to examine histograms showing how many times a given amino-acid appears at a specific location. These histograms can identify locations at which a specific amino-acid appears more than 70-80% of the time. The locations identified in this way seem to be most effective at uniquely identifying the two kinds of aquaporin proteins and, therefore, they are the best candidates for locations that should be manipulated to produce a therapeutic result. A correlated sequence analysis (CSA) of this data, with a careful choice of parameters, identified the same locations as important. However, the DQC analysis was needed to set the direction. Moreover, it is much simpler, much faster and quite convincing even before a rigorous statistical analysis is applied. DQC can be applied to source data where the importance one or more features of the data are unknown in order to provide an initial analysis of the relative value of the features of the data to a provided hypothesis. In this way, DQC can be employed to efficiently test hypotheses related to a set of source data and guide the formation of more formal analyses of the data.

This example shows how DQC can be used to attack a problem where, from the outset, one has a classification of items in the dataset, but one does not know if the measured data contains the information needed to explain this classification. This kind of problem is common to many fields. As another example, assuming that one has the full genome and medical history for an individual, can one predict from the genome data whether the person has, or will have, a particular disease? This analysis shows that once one knows that the necessary information is present in the data, one can identify unimportant features by the fact that eliminating them improves the clustering results.

Figure 14A:
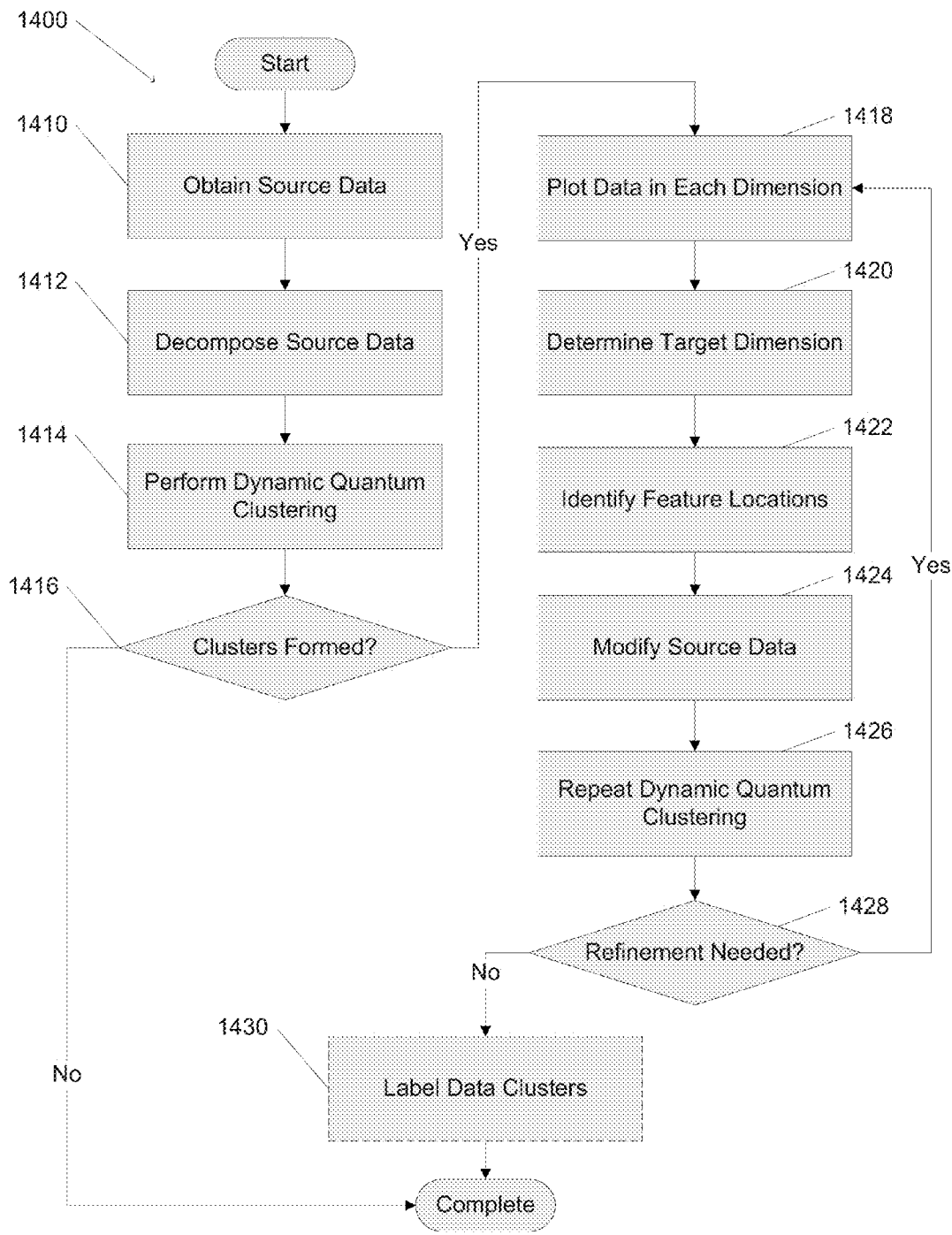
FIG. 14A is a flow chart illustrating a process for feature selection using dynamic quantum clustering in accordance with an embodiment of the invention.
Figure 14C:
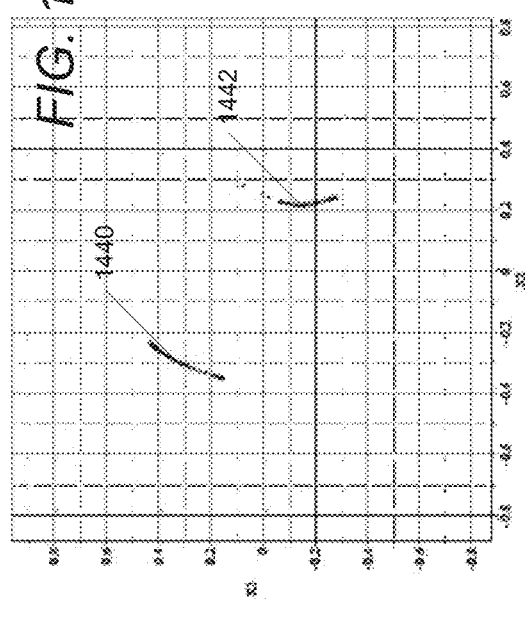
FIGS. 14B-E are conceptual illustration of generated representations of a feature selection process using dynamic quantum clustering in accordance with embodiments of the invention.
Figure 14E:
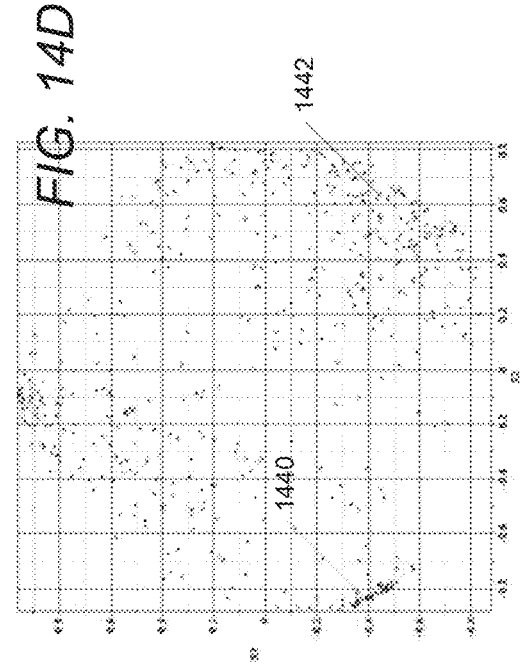
Figure 14B:
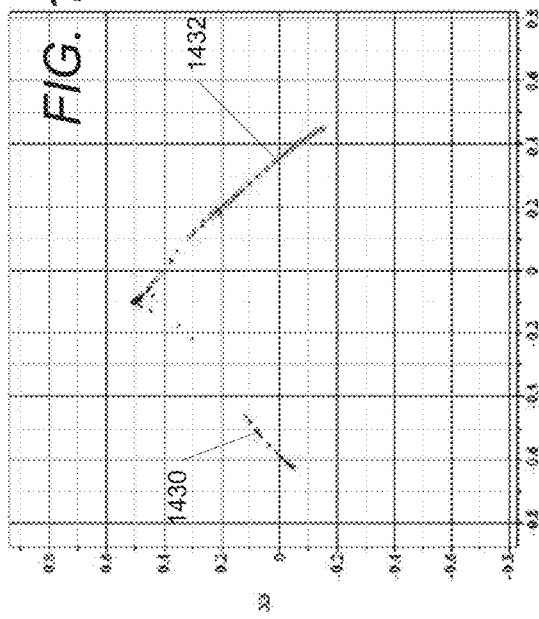
Figure 14D:
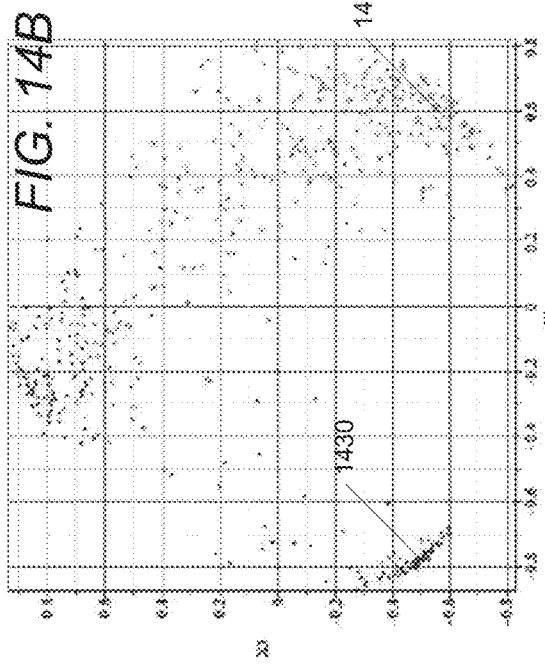

Turning now to FIG. 14A, a process for feature selection using dynamic quantum clustering in accordance with an embodiment of the invention is shown. The process 1400 includes obtaining (1410) source data and decomposing (1412) source data. Dynamic quantum clustering is performed (1414) and, if clusters are not formed, the process 1400 completes. If clusters are formed, data is plotted (1418) in each dimension and target dimension(s) are determined (1420). Feature locations are identified (1422), source data is modified (1424), and dynamic quantum clustering is repeated (1426). If refinement is needed (1428), the process repeats. If no refinement is needed (1428), data clusters can be labeled (1430). Although specific processes for performing feature selection using dynamic quantum clustering in accordance with embodiments of the invention are described above, any of a variety of techniques can also be performed in accordance with embodiments of the invention.

Classifying Data

A common question in the analysis of source data is using a set of previously classified training data in order to classify new data without having to re-run a large analysis. The structure of DQC makes it easy to construct such a classifier based on a set of training data and apply it to the new data data. In this way, the intermediate output of a DQC analysis creates a classifier that can be used on in the same way as a neural network or any other machine learning techniques.

In several embodiments, the DQC analysis begins by constructing several quantum operators, e.g., the exponential of the quantum Hamiltonian and the position operators whose expectation values give us the location of the center of a particular Gaussian in feature space for a set of training data. These operators are stored for future reference. DQC is performed on the training data until it has produced final structures, be they compact clusters or extended figures. The final pattern (i.e. structures, figures, and clusters) of points as well as the information about how many steps of DQC evolution were used in the process and/or the labels of the patterns are stored. To operate on new data, the evolution operators, information about the final clusters, and the number of steps of DQC evolution used to characterize the set of training data is utilized in performing DQC processes on the new data. If SVD decomposition (or any other data aggregation and/or sampling) was used before evolving the original data, the SVD matrices (or any other data aggregation and/or sampling metadata) can also be utilized. In a number of embodiments, the SVD decomposition of the training data is used to map the new data into the appropriate form. Then the new data is evolved according to the usual DQC procedure for the required number of steps. The location of the nearest cluster in the final form of the training data data to the final location of the new data point is determined for some or all of the data points in the new data. In this way, the classification of the new point can be identified in terms of the patterns generated using the set of training data.

In several embodiments, there are varieties of confidence checks that can be performed to insure that the new data is properly represented by the training data. First, in embodiments utilizing SVD, after using the SVD matrices to map the new data into the appropriate coordinates, a check can be performed so that these coordinates lie inside the appropriate unit cube. If not, then one has to decide if one will trust the final result. Second, the expansion of the new data point in terms of the template basis (this is done with one of the operators constructed at the beginning of DQC evolution) can be checked to see if it results in a vector whose length is greater than a threshold accuracy measurement. This threshold can be pre-defined and/or determined dynamically based on the requirements of specific applications of embodiments of the invention. If a great deal of data fails to pass these tests (i.e. if the confidence in the result is below a threshold value), the confidence can be increased by adding some of the new data to the set of training data and re-running the initial classification. In this way, confidence in the classification of the new data can be improved.

Example: Earthquake Data Set

Earthquakes are conventionally labeled by magnitude, location and time of occurrence, although other physical characteristics can be included. In this example, it is shown that DQC can be utilized to analyze the earthquakes to show clustering considering the physical parameters of the earthquakes and ignores location and time of occurrence information. The data comes from a catalog of 5693 earthquakes that occurred in the Eastern Mediterranean Region (EMR) and the Dead Sea Fault (DSF) over a 20 year period. In addition to location and time of occurrence, this catalog contains five physical parameters for each earthquake— magnitude of the earthquake, seismic moment, stress drop of the fault due to the earthquake, source radius, and corner frequency (beyond which the spectrum is white noise).

DQC processes were performed on a 5-dimensional SVD transformation of feature space. The data points eventually converged onto a few clusters. Turning now to FIG. 15B, the initial directions of motion of the data points, in the form of unit vectors of −gradV are shown. Note that no obvious separations that indicate cluster boundaries exist in the data, as shown by the red points 1530, cyan points 1532, blue points 1534, orange points 1536, and black points 1538. Nonetheless, the movement of the data points is dominated by centers of high density of events that become fixed points of the dynamics of the DQC processes. Clusters were obtained from information of the distribution of events in parameter space without any reference to the temporal and geographic location of the earthquakes. The combination of the DQC results with time and location information revealed interesting correlations with known faults. Turning now to FIG. 15C, the location of the various earthquakes, colored according to cluster as described above with respect to FIG. 15B, on a map of the Middle East revealing the surprising result that almost all events of the orange cluster 1536 are concentrated geographically around the Gulf of Aqaba. An analysis of their distribution in the original parameter space shows that these earthquakes are of low magnitude but possess relatively large stress-drop values. Moreover, it turns out that almost all orange events 1536 have mostly occurred within a few months following the strongest earthquake that took place on Nov. 22, 1995 in the Gulf of Aqaba. In hindsight, one may now assign a geophysical meaning to events of the orange cluster 1536. That is, the orange points represent major ruptures that have occurred following the strongest earthquake. Indeed, analysis of events in the relevant period observed slip distributions that were unique to just this period.

Example: Analyzing X-Ray Absorption Data

Materials that exhibit complex structure at many different scales abound in nature and technology. Examples of such materials are the electrodes of lithium-ion batteries, human bone and Roman pottery. Understanding these materials requires studying them with both very high resolution and a large field of view. This requires devices capable of collecting this kind of massive data and new methods to analyze this data once it has been collected. X-ray absorption spectroscopy is used to study the chemical and physical structure of samples from biology, archeology, materials science, etc. The TXM-XANES microscope, located at the Stanford Synchrotron Radiation Lightsource (SSRL), is a new device that enables researchers to efficiently study hierarchically complex materials. DQC can be employed to analyze this kind of data without expert knowledge or a priori assumptions. The specific problem is the analysis of x-ray absorption data taken from a piece of glossy red and black Roman pottery dating back to the first century BCE. This large dataset, while small compared to what would result from the study of a functioning lithium-ion battery, is nevertheless a good proxy for the battery problem because the two problems share important common features. In particular, the oxidation-reduction chemistry occurring in these ceramics is quite similar to the charging-discharging chemistry that occurs at the electrodes of a lithium-ion battery due to percolation of oxygen through the hierarchy of nanometer to micron sized cracks and pores. The raw data consists of 669,559 x-ray absorption spectra. Each x-ray absorption spectrum (XANES) records the absorption of x-rays by a single location on the sample. This absorption spectrum is measured at 146 distinct energies. The shape of any one spectrum contains information about the oxidation state of iron at one specific location. The goal is to produce a map of the sample showing the oxidation state of iron, the density of this iron oxide and the matrix of material other than iron that can be found in each 30 nm×30 nm pixel. Identifying regions having the same composition amounts to identifying absorption spectra that have similar shapes. This kind of problem is usually studied by fitting the spectra to linear combinations of known reference spectra, but this approach suffers from serious ambiguities. DQC provides an unbiased way of approaching the problem.

In order to rescale the data to fit into a unit cube in n-dimensions and to remove stochastic noise, we begin the analysis by constructing a Singular Value Decomposition (SVD) [4] $M_{data}$, the 666,559×146 data matrix, each of whose rows is one absorption spectrum. SVD decomposes $M_{data}$ into a product of three matrices; i.e., $$M_{data} = USV^{tr}$$

U is a 666,559×666,559 unitary matrix, S is a 666,559×146 real matrix with entries only on the principal diagonal, and $V^{tr}$ is a 146×146 unitary matrix. The eigenvalues (ranked in decreasing magnitude) in S fall off rapidly, and the slope of the fall-off changes markedly at the fifth eigenvalue.

By approximating $M_{data}$ by truncating U to its first five columns, S to its first five eigenvalues and to its first five rows achieves a significant reduction in stochastic noise without losing the important features of most of the spectra. While all of the higher SVD components contain mostly noise, we know that some subtle information is lost by removing them. Most important is that by approximating the current dataset by truncating to the first five SVD eigenvectors, one partially suppresses a distinct spectral feature of a minority (~0.1%) component that spectroscopists use to identify un-oxidized iron. Despite this, we will demonstrate that DQC is still able to extract this minority phase from the 5-dimensional SVD representation. Note that, while we use the truncated SVD space for performing DQC clustering, we will only use averages of the raw data over clusters, structures, and/or any other features to determine their chemical compositions.

DQC evolution begins by assigning five-dimensional coordinates to each data point. This is done by associating a specific data entry with the corresponding row of U (restricted to its first five columns and normalized to produce vectors of unit length). FIGS. 15D-F shows a series of frames, the first of which, FIG. 15D, is a plot of the starting configuration of the original data for dimensions 1-3. The frames show red data points 1540, green 1542, dark green 1544, and blue 1544. It is clear that at the outset no obvious separation of the data exists in these coordinates. This lack of separation is typical of large complex datasets. FIGS. 15E and 15F show different time steps in the DQC evolution of the source data. As is evident from these plots, we see that the blue points 1546 shown in FIG. 15E separate and collapse and are a single fixed point by FIG. 15F. This all occurs at a very early stage of the evolution. The rest of the data begins collapsing into strands, eventually stabilizing either as small clusters of fixed points or what can be described as string figures.

In this example, the DQC evolution produced at least nine major topological features that are identified as extended structures. Two approaches were used to decode the information encoded in these complex shapes. First, we searched for commonality among connected or adjacent structures. Second, we looked for variation and sub-structure within a shape. Following the first procedure, we averaged the raw spectra for those data points that belong to an individual component of the complex figures seen in the last plot of FIG. 15F. The average of each of the four substructures produces curves that look very similar, with most of the difference occurring in the absorption below the iron edge (the sharp rise in the spectrum). Similarly, averages obtained from the green 1542 sub-structures also look very similar to one another. However, the green 1542 spectra are clearly significantly different from the red 1540 curves. We know that the absorption below the iron edge is due to material that does not contain iron and we know that the difference in height between the absorption below the iron edge and well above the iron edge is related to the density of the iron oxide. This implies that if we remove this information from the raw data the curves should become identical. To accomplish this we implement a simple normalization procedure in which the average of the lowest 20 energy points is subtracted from the raw spectrum and the resulting spectrum is rescaled so the average of the highest 20 energy points is unity. In several embodiments, computing the average for the components of the "dancing man" for the red 1540 normalized data results in four curves that cannot be distinguished from one another. Similarly, the same procedure applied to the green 1542 curves causes them to all collapse to a single curve. The different behaviors of the red 1540 and green 1542 average curves are quite similar to those of hercynite and hematite reference spectra and can then be assigned those labels.

We next focus on the pixels that rapidly separated during the evolution of the full data (the blue 1546 area in FIG. 15D). The DQC evolution of the raw versus the normalized data for these points was compared the evolution to be very similar. In each case, a subset of 60 points immediately separated from the rest. An inspection of the raw data (i.e. source data) reveals that some of these spectra closely match the spectrum of metallic iron, where some of the others match magnetite. Finally, labels are assigned associated with the 4 distinct XANES clusters to the locations on the original sample that each spectrum came from as shown in FIG. 15G. This plot shows that the green 1542 (hematite-like) and red 1540 (hercynite-like) structures lie in contiguous geometric regions, and the blue 1546 cluster lies in a well-separated corner. This geometrical congruence alone serves as a sanity check on the DQC results, because geometrical proximity was not used as an input to the DQC analysis. Of particular importance is the blue 1546 cluster, making it possible to clearly see where we find the 60 metallic iron plus magnetite pixels.

This example illustrates how DQC is capable of analyzing large and complex datasets without using expert information or making assumptions about the type or number of clusters that may exist. Additionally, the DQC processes have identified and extracted meaningful extended structures that are not isolated fixed points of the quantum evolution. Moreover, when such structures exist, it is possible to understand the kind of information they encode. This example also demonstrates that DQC can find small regions of interest within such big data sets because it is sensitive to small variations in the density of the data. These results are in general agreement with a supervised analysis of the same data carried out by looking for the best fit to a pixel spectral superposition of hercynite, hematite, and pure iron. The information about the varying density of iron oxides and the matrix of other material is reflected in the assignment of different shades of red or green to each part of an extended structure. The fact that the DQC analyses identified clusters of metallic iron and established the unexpected presence of magnetite clusters demonstrates the ability of DQC to reveal unexpected features of the data.

Figure 15A:
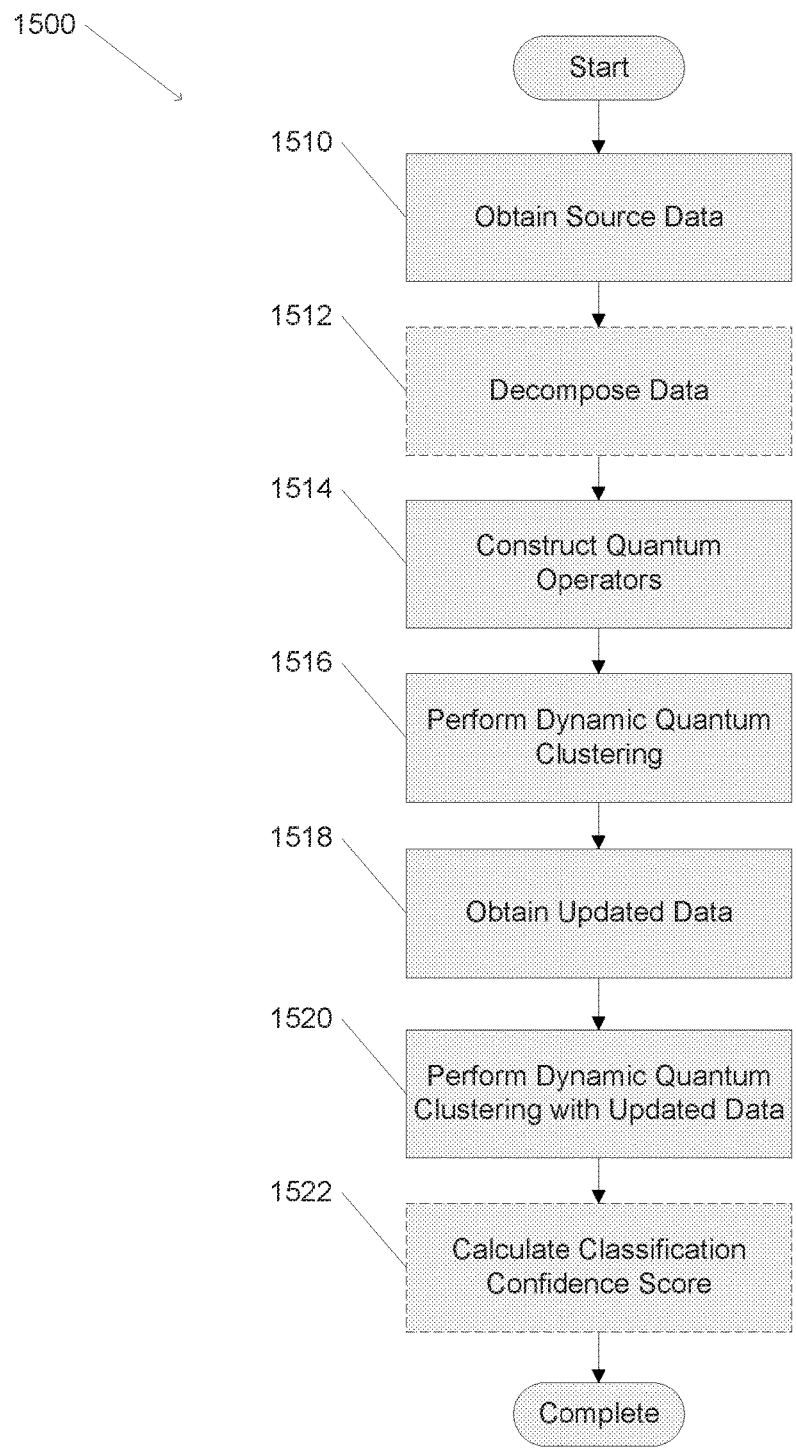
FIG. 15A is a flow chart illustrating a process for classifying data using dynamic quantum clustering in accordance with an embodiment of the invention.
Figure 15C:
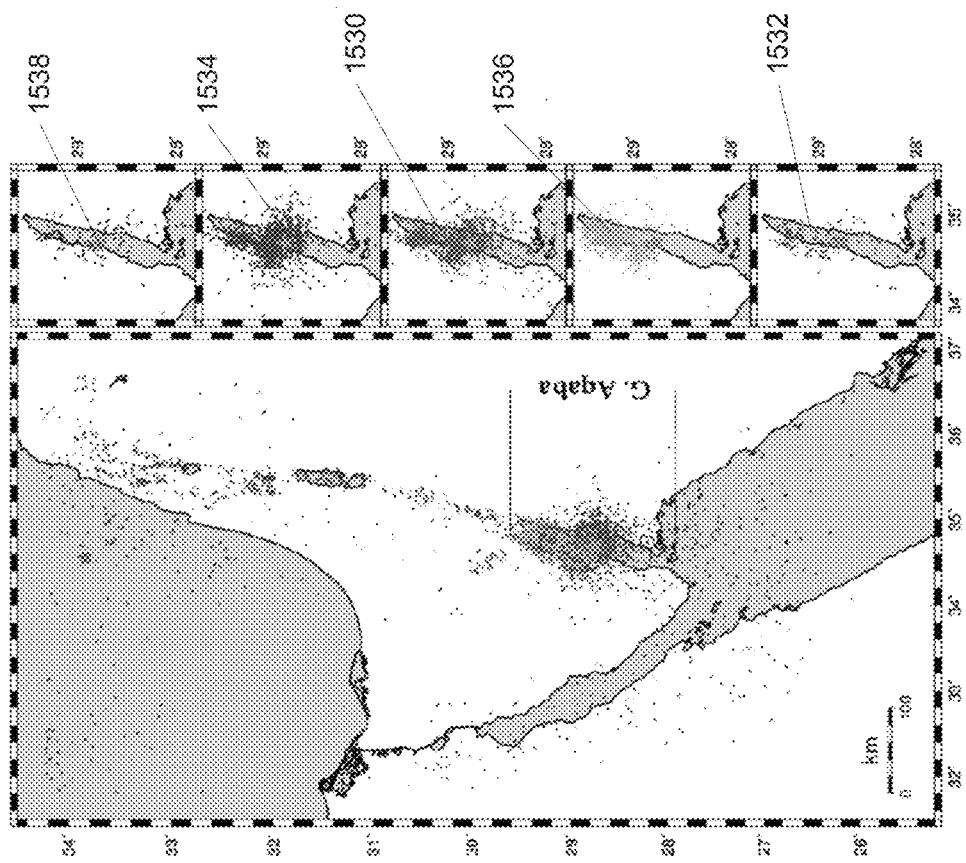
FIGS. 15B-C are conceptual illustrations of the magnitude and location of earthquake events in accordance with embodiments of the invention.
Figure 15B:
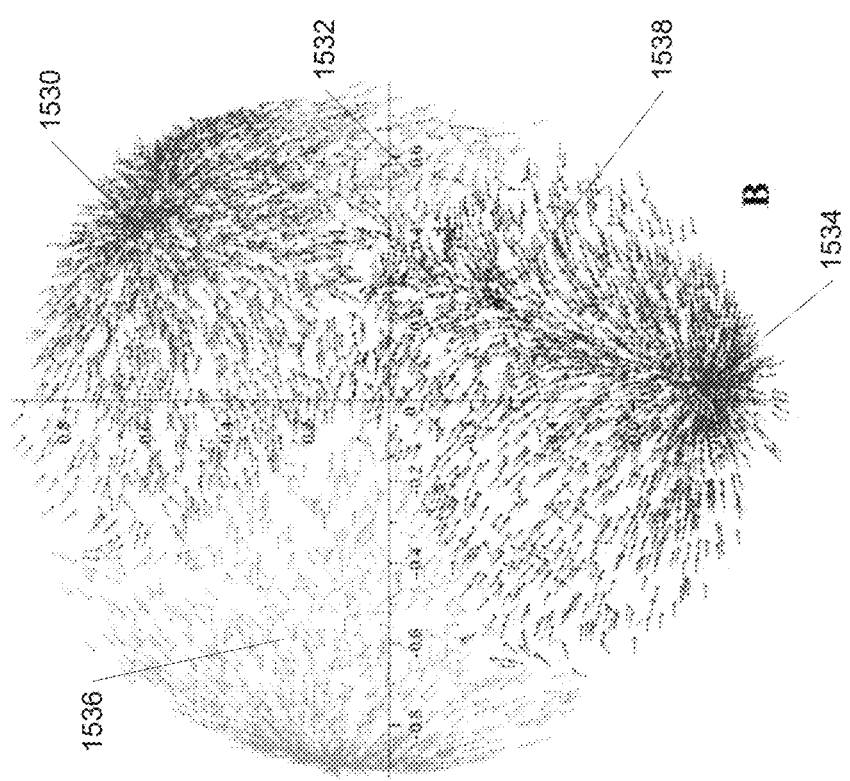
Figure 15D:
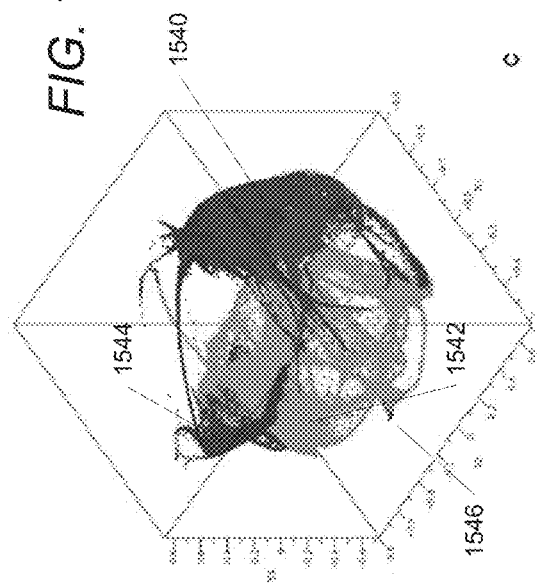
FIGS. 15D-G are conceptual illustrations of a variety of chemical phases identified using DQC processes in accordance with embodiments of the invention.
Figure 15E:
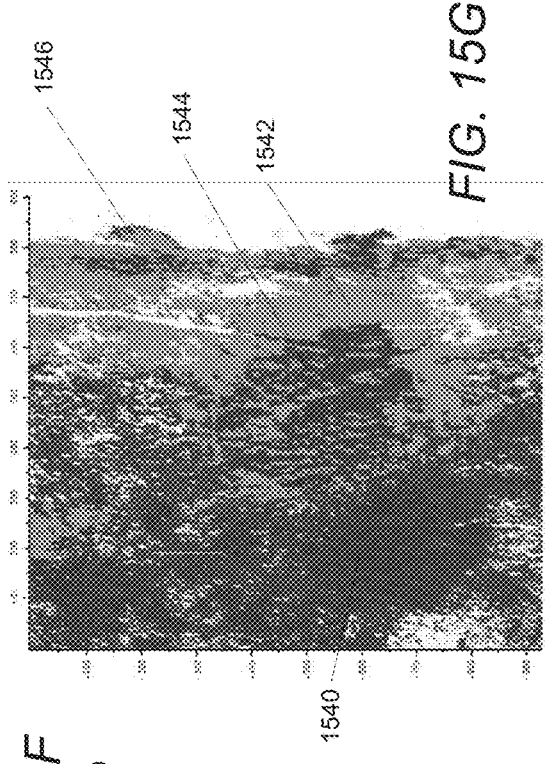
Figure 15F:
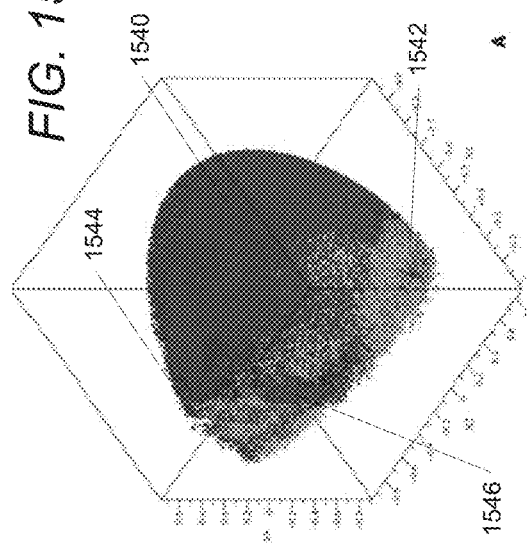
Figure 15G:
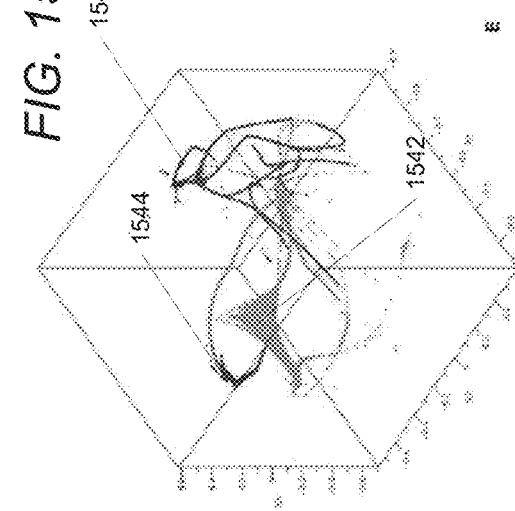

Turning now to FIG. 15A, a process for classifying data using dynamic quantum clustering in accordance with an embodiment of the invention is shown. The process 1500 includes obtaining (1510) source data and, in a number of embodiments, decomposing (1512) some or all of the source data. Quantum operators are constructed (1514) and dynamic quantum clustering is performed (1516). Updated data is obtained (1518), dynamic quantum clustering is performed (1520), and in several embodiments a classification confidence score is calculated (1522). Although specific processes for classifying data using dynamic quantum clustering in accordance with embodiments of the invention are described above, any of a variety of techniques can also be performed in accordance with embodiments of the invention.

Determining Parameters

Beginning a DQC analysis often includes setting one parameter, the width of the Gaussian used to represent a data point. In several embodiments, this width can be chosen arbitrarily, observing how the evolution progresses for a few frames, and then modifying the width according to the results. However, for large datasets in high dimension this can a very time consuming approach and usually fails to result in an optimal choice. However, the width can be chosen to exploit the Hilbert space nature of the DQC processes to choose sigma while also choosing a set of template states. Template states, such as those described above, are a subset of the full dataset that form an essentially complete basis for the data. To be precise, by representing each data point by represented by a Gaussian function of unit norm in the space of features, the dataset can be mapped into a subspace of Hilbert space with dimension less than or equal to the number of data points. By computing Hilbert space scalar products of the data points, linear combinations of these Hilbert space vectors that form and ortho-normal bases for the smallest linear subspace containing all of the data can be identified. In a variety of embodiments, the dimension of this subspace is significantly smaller than the number of data points. The original data points can be expanded as linear combinations of these orthonormal vectors. In many embodiments, a template basis includes choosing an orthonormal set of vectors that allow expansion of all of the data points to a particular level of accuracy. Accordingly, a template basis need not be a basis in the usual sense. Due to the overlaps of Hilbert space vectors depending on the choice of the width of the Gaussian functions, the appropriate choice of a template bases depends upon the parameter sigma. We now describe a sigma dependent prescription for simultaneously choosing the appropriate template basis and a best value for sigma.

In many embodiments, optimal parameters can be determined by randomly selecting one of the data points from the full set of data and then computing the scalar product of this data point with all of the other data points. The remaining data points can be ordered according the size of the overlaps and another point can be chosen by selecting the point that has the smallest overlap with the originally chosen data point. Next, using the two points that have been selected, the projection of the remaining data points onto the subspace spanned by the two points is computed. The remaining points can be re-ordered according to the length of the projection and the data point that has the smallest projection can be chosen as a third point to the evolving template basis. This process can be repeated until a number of vectors (pre-determined and/or determined dynamically) are chosen to form the basis. This choice can be based upon computing resources (i.e. memory, processing power, available time, credit available, or any other resource) available to the analysis. The value of the sigma can be adjusted so that the smallest projection of data points in the full sample with the template basis exceeds an accuracy threshold. This accuracy threshold can be pre-determined and/or determined dynamically based on the data. This can then be utilized as the basis to construct the Hamiltonian and to carry out the DQC evolution process.

Figure 16:
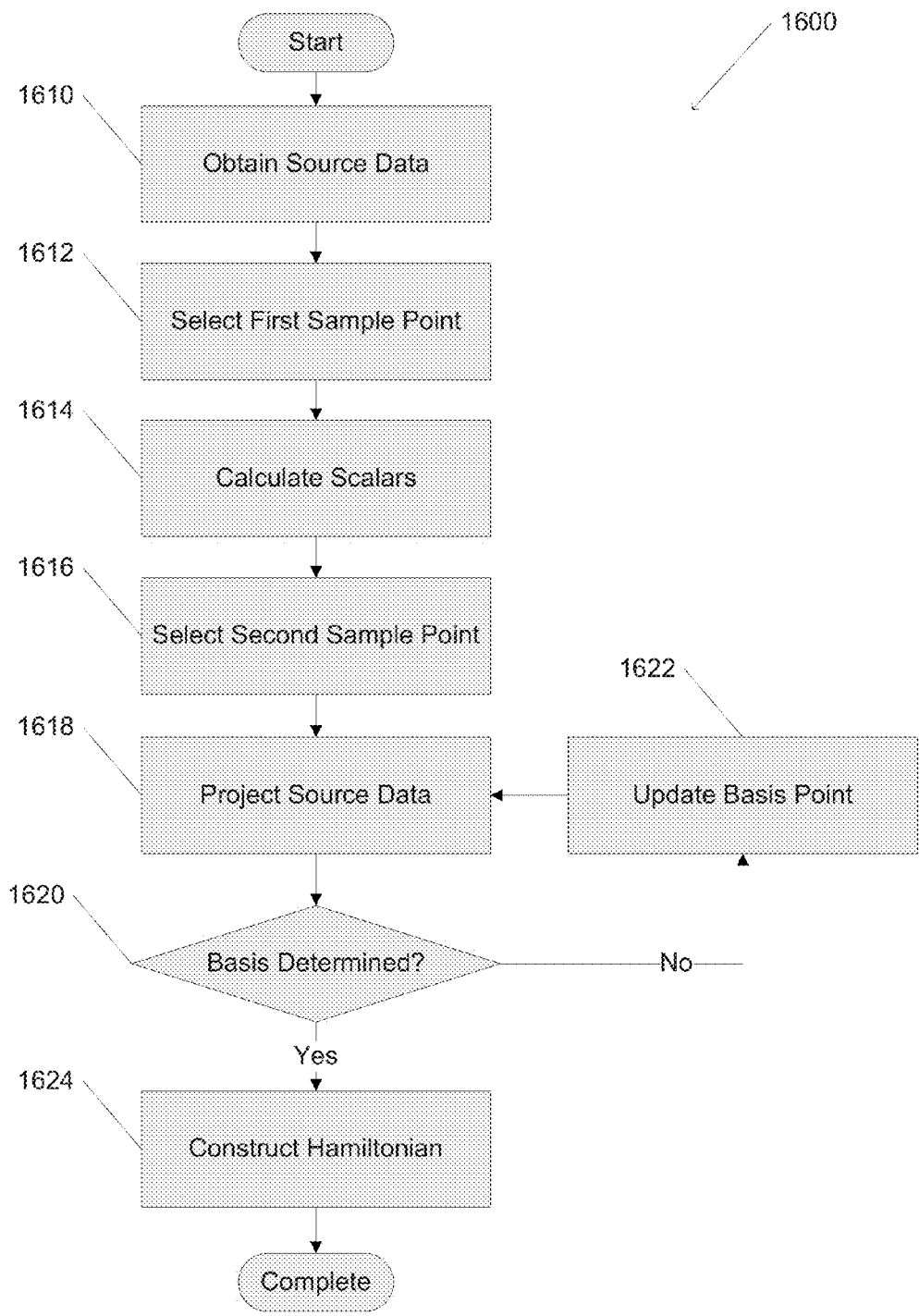
FIG. 16 is a flow chart illustrating a process for determining improved parameters utilized in dynamic quantum clustering in accordance with an embodiment of the invention.

Turning now to FIG. 16, a process for determining improved parameters utilized in dynamic quantum clustering in accordance with an embodiment of the invention is shown. The process 1600 includes obtaining (1610) source data and, selecting (1612) a first sample point, and calculating (1614) scalars. A second sample point is selected (1616) and source data is projected (1618). If a basis is determined (1620), a Hamiltonian is constructed (1624). If a basis is not determined (1620), the basis point is updated (1622) and source data is projected (1618). Specific processes for determining improved parameters utilized in dynamic quantum clustering in accordance with embodiments of the invention are described above; however, any of a variety of techniques, including those that utilize alternative statistical techniques to construct the Hamiltonian (or any function that is substituted for the Hamiltonian) in the dynamic quantum clustering processes, can also be performed in accordance with embodiments of the invention.

Dynamic Quantum Clustering Systems

Figure 10:
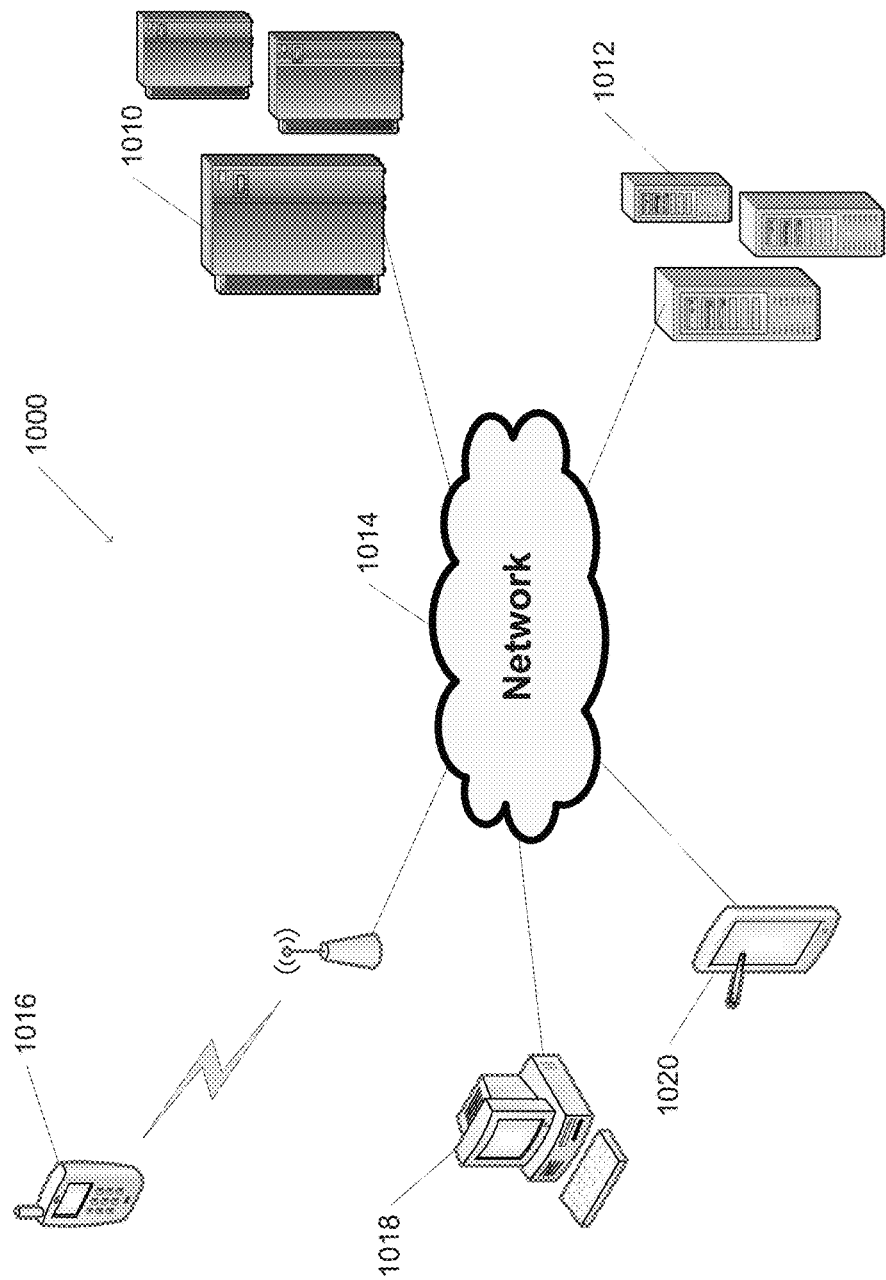
FIG. 10 is a network diagram conceptually illustrating a dynamic quantum clustering system in accordance with an embodiment of the invention.

Dynamic quantum clustering systems in accordance with embodiments of the invention allow for the identification of structure inherent in a set of data, provided that there is any structure within the data. In this way, dynamic quantum clustering systems can be utilized to identify the lack of structure within a set of data. The clustered data can be presented to a variety of human and/or machine annotators in order to identify and/or label clusters as appropriate to the requirements of specific applications of the invention. A conceptual diagram of a dynamic quantum clustering system in accordance with an embodiment of the invention is shown in FIG. 10. The dynamic quantum clustering system 1000 includes a dynamic quantum clustering server system 1010, content servers 1012, and one or more client devices such as, but not limited to, mobile devices 1016, personal computers 1018, and tablet devices 1020, configured to communicate via a network 1014. In a variety of embodiments, the network 140 is a local area network (LAN), although any network such as a wide area network and/or the Internet can be utilized as appropriate to the requirements of specific applications of embodiments of the invention. In many embodiments, the dynamic quantum clustering server system 1010 is configured to obtain source data (or any other set of data) from the content servers 1012 and perform dynamic quantum clustering processes on the obtained source data. In a variety of embodiments, the dynamic quantum clustering system 1010 is further configured to generate representations of the clustered data and present those generated representations directly and/or via the client devices. In several embodiments, the client devices are configured to facilitate the identification and/or labeling of clusters within the generated representation. This can be done using any of a variety of techniques, including crowdsourced identification, expert labeling, image processing of the generated representation, and any of a variety of machine learning techniques, as appropriate to the requirements of specific applications of embodiments of the invention.

Although a specific architecture of a dynamic quantum clustering system in accordance with embodiments of the invention are discussed above and illustrated in FIG. 10, a variety of architectures, including content servers not specifically described and those that utilize multiple dynamic quantum clustering systems, can be utilized in accordance with embodiments of the invention.

Dynamic Quantum Clustering Server Systems

Figure 11:
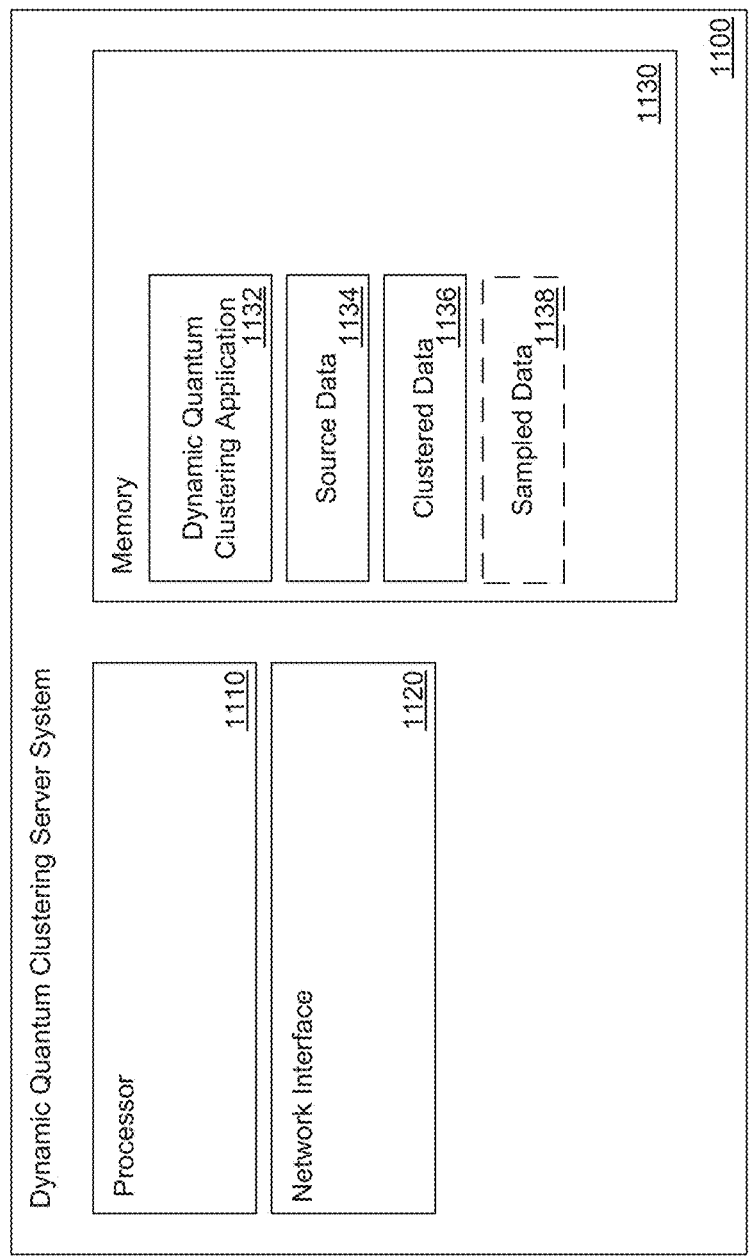
FIG. 11 is a system diagram conceptually illustrating a dynamic quantum clustering server system in accordance with an embodiment of the invention.

Dynamic quantum clustering server systems in accordance with embodiments of the invention can cluster and/or identify structure(s) of a set of data. A conceptual illustration of a dynamic quantum clustering server system in accordance with an embodiment of the invention is shown in FIG. 11. The dynamic quantum clustering server system 1100 includes a processor 1110 in communication with memory 1130. The dynamic quantum clustering server system 1100 also includes a network interface 1120 configured to send and receive data over a network connection. In a number of embodiments, the network interface 1120 is in communication with the processor 1110 and/or the memory 1130. In several embodiments, the memory 1130 is any form of storage configured to store a variety of data, including, but not limited to, a dynamic quantum clustering application 1132, source data 234, clustered data 1136, and/or sampled data 1138. In many embodiments, the dynamic quantum clustering application 1132, source data 234, clustered data 1136, and/or sampled data 1138 are stored using an external server system and received by the dynamic quantum clustering server system 1100 using the network interface 1120.

The processor 1110 is directed by the dynamic quantum clustering application 1132 to perform a variety of dynamic quantum clustering processes including, but not limited to, those described above. These processes can include pre-processing source data 1134 to create sampled data 1138 and performing dynamic quantum clustering processes on the sampled data. The sampled data 1138 can be generated utilizing any of a variety of techniques, including singular value decomposition, random sampling, feature detection, aggregation, truncating the source data 1134, and any other techniques as appropriate to the requirements of specific applications of embodiments of the invention.

A specific architecture for a dynamic quantum clustering server system in accordance with an embodiment of the invention is conceptually illustrated in FIG. 11; however, any of a variety of architectures, including those which store data or applications on disk or some other form of storage and are loaded into memory at runtime and systems that are distributed across multiple physical servers, can also be utilized in accordance with embodiments of the invention. In a variety of embodiments, the memory includes circuitry such as, but not limited to, memory cells constructed using transistors, that are configured to store instructions. Similarly, the processor can include logic gates formed from transistors (or any other device) that are configured to dynamically perform actions based on the instructions stored in the memory. In several embodiments, the instructions are embodied in a configuration of logic gates within the processor to implement and/or perform actions described by the instructions. In this way, the systems and methods described herein can be performed utilizing both general-purpose computing hardware and by single-purpose devices.

Although the present invention has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method for data clustering, comprising:

obtaining a set of source data using a dynamic quantum clustering server system, where the set of source data comprises a data dimensionality;

assigning a subset of the set of source data to a representational space using the dynamic quantum clustering server system, where the representational space allows a distance between pieces of data in the set of source data to be measured;

constructing a potential function based on the representational space and the set of source data using the dynamic quantum clustering server system;

computing a set of frames of animation for the set of source data over a time interval using the dynamic quantum clustering server system wherein computing a frame of animation includes:

associating data points from the set of source data with states, where the states include initial wave functions;

computing kinetic and potential energies for each initial wave function;

determining updated wave functions based on the kinetic and potential energies of each initial wave function;

determining at least one trajectory for the time interval based on the updated wave functions; and constructing the frame of animation based on the at least one trajectory;

evaluating the computed set of frames of animation for the set of source data using the dynamic quantum clustering server system, where the evaluation identifies data clusters comprising a subset of the set of source data within the computed set of frames of animation:

when a cluster threshold is reached:

generating a representation of the computed set of frames of animation using the dynamic quantum clustering server system; and transmitting the generated representation to a client device displaying the generated representation by providing an interactive visual animation of point positions at one or more selected times; and when the cluster threshold is not reached, iteratively:

identifying strongly clustered data in the computed set of frames of animation using the dynamic quantum clustering server system;

filtering the strongly clustered data from the set of source data to generate a set of filtered data using the dynamic quantum clustering server system; and computing a second set of frames of animation for the set of filtered data using the dynamic quantum clustering server system.

2. The method of claim 1, further comprising labeling the data clusters using the dynamic quantum clustering server system.

3. The method of claim 2, wherein the data clusters are labeled with color information using the dynamic quantum clustering server system.

4. The method of claim 1, further comprising preprocessing the set of source data points to reduce the dimensionality of the set of source data using the dynamic quantum clustering server system.

5. The method of claim 4, wherein the set of source data is preprocessed using singular value decomposition.

6. The method of claim 1, wherein the potential function is determined such that a quantum mechanical ground state of the potential function is equal to the sum of the initial states of the potential function.

7. The method of claim 6, wherein the potential function is constructed as a sum of Gaussian functions centered at each data point in the set of source data.

8. The method of claim 6, wherein computing a set of frames of animation comprises computing an expectation value of a quantum mechanical position operator using the dynamic quantum clustering server system.

9. The method of claim 1, further comprising displaying the generated representation by providing an interactive visual display of point positions at one or more selected times using the dynamic quantum clustering server system.

10. The method of claim 1, further comprising transmitting the generated representation to a client device configured to provide an interactive visual display of the generated representation.

11. The method of claim 1, further comprising obtaining labeling data using the dynamic quantum clustering server system, where the labeling data identifies one or more features of the data clusters.

12. The method of claim 1, wherein the representational space comprises a Hilbert space.

13. The method of claim 1, wherein the potential function satisfies a time-independent Schrödinger equation.

14. The method of claim 1, further comprising generating a matrix representation of the obtained source data using the dynamic quantum clustering server system, where the matrix representation is utilized in place of the obtained source data.

15. The method of claim 1, wherein:
the potential function comprises a set of initial states; and
the cardinality of the set of initial states is based on the number of data points in the set of source data.

16. The method of claim 1, further comprising:
generating the filtered data based on the strongly clustered data using the dynamic quantum clustering server system, where the filtered data comprises the strongly clustered data; and
computing the second set of frames of animation for the set of filtered data using the dynamic quantum clustering server system, where the second set of frames of animation comprises a set of frames of animation of the strongly clustered data.

17. The method of claim 1, wherein the strongly clustered data is centered around a local minimum in the representational space.

18. The method of claim 1, further comprising:
identifying when at least one piece of strongly clustered data becomes less strongly clustered using the dynamic quantum clustering server system; and
cease iteratively computing the second set of frames of animation using the dynamic quantum clustering server system.

* * * * *